United States Patent
Noguchi et al.

(10) Patent No.: US 8,905,884 B2
(45) Date of Patent: Dec. 9, 2014

(54) VEHICLE DRIVE DEVICE

(71) Applicant: Honda Motor Co., Ltd., Minato-ku, Tokyo (JP)

(72) Inventors: Masatoshi Noguchi, Wako (JP); Masayuki Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 97 days.

(21) Appl. No.: 13/853,778

(22) Filed: Mar. 29, 2013

(65) Prior Publication Data

US 2013/0260956 A1      Oct. 3, 2013

(30) Foreign Application Priority Data

Mar. 30, 2012  (JP) ................. 2012-082941

(51) Int. Cl.
| | |
|---|---|
| *F16H 37/08* | (2006.01) |
| *B60K 1/02* | (2006.01) |
| *B60K 7/00* | (2006.01) |
| *B60K 17/04* | (2006.01) |
| *B60L 15/20* | (2006.01) |
| *B60K 1/00* | (2006.01) |

(52) U.S. Cl.
CPC ........... *B60K 1/02* (2013.01); *B60K 7/0007* (2013.01); *B60K 17/043* (2013.01); *B60L 15/2045* (2013.01); *B60K 2001/001* (2013.01); *Y02T 10/648* (2013.01)

USPC .................. 475/150; 475/5; 477/3

(58) Field of Classification Search
None
See application file for complete search history.

(56) References Cited

U.S. PATENT DOCUMENTS 6,321,865 B1 * 11/2001 Kuribayashi et al. ......... 180/243

FOREIGN PATENT DOCUMENTS

JP          2010-235051 A       10/2010

* cited by examiner

*Primary Examiner* — Erin D Bishop
(74) *Attorney, Agent, or Firm* — Westerman, Hattori, Daniels & Adrian, LLP

(57) ABSTRACT

According to the embodiment, the electric motor controller is configured to perform control such that a free-state limit torque after switching from the ring-locking state to the free state is set to a value larger in absolute value than an upper limit torque of the first electric motor or the second electric motor determined by electric motor specifications at the time of switching from the ring-locking state to the free state or is set to a value larger in absolute value than a restricted state limit torque at the time of switching from the ring-locking state to the free state. The restricted state limit torque is a limit torque of the first electric motor or the second electric motor, and the electric motor controller performs control such that the torque generated by the first electric motor or the second electric motor is less than the free-state limit torque.

12 Claims, 20 Drawing Sheets

FIG. 4

| VEHICLE STATE | FRONT UNIT | REAR UNIT | REAR MOTOR | OWC | BRK |
|---|---|---|---|---|---|
| STOP | × | × | STOP | OFF | OFF |
| FORWARD LOW-SPEED | × | ○ | POWER DRIVE | ON | ON (WEAK ENGAGEMENT) |
| FORWARD MIDDLE-SPEED | ○ | × | STOP | OFF | ON (WEAK ENGAGEMENT) |
| DECELERATION REGENERATION | ○ | ○ | REGENERATIVE DRIVE | OFF | ON |
| ACCELERATION | ○ | ○ | POWER DRIVE | ON | ON (WEAK ENGAGEMENT) |
| FORWARD HIGH-SPEED (WITH NO DRIVE REQUEST) | ○ | × | STOP | OFF | OFF |
| FORWARD HIGH-SPEED (WITH DRIVE REQUEST) | ○ | RING-FREE CONTROL | POWER DRIVE | OFF | OFF |
| BACKWARD | × | ○ | REVERSE POWER DRIVE | OFF | ON |

FORWARD MIDDLE-SPEED

DECELERATION REGENERATION

VEHICLE DRIVE DEVICE

CROSS-REFERENCE TO RELATED APPLICATION

This application claims priority from Japanese Patent Applications No. 2012-082941, filed on Mar. 30, 2012, the entire contents of which are herein incorporated by reference.

BACKGROUND

1. Technical Field

The present invention relates to a vehicle drive device provided with a left wheel drive unit for driving a left wheel and a right wheel drive unit for driving a right wheel.

2. Description of the Related Art

In JP-A-2010-235051, a vehicle drive device is described which is equipped with a left wheel drive unit having a first electric motor for driving a left wheel of a vehicle and a first planetary gear transmission provided on the power transmission path between the first electric motor and the left wheel, and also equipped with a right wheel drive unit having a second electric motor for driving a right wheel of the vehicle and a second planetary gear transmission provided on the power transmission path between the second electric motor and the right wheel. In the first and second planetary gear transmissions, the first and second electric motors are respectively connected to the sun gears thereof, the left wheel and the right wheel are respectively connected to the planetary carriers thereof and the ring gears thereof are connected to each other. Furthermore, the vehicle drive device is provided with braking means for braking the rotation of the ring gears by releasing or engaging the connected ring gears and is also provided with a one-way clutch.

According to JP-A-2010-235051, the vehicle drive device configured as described above is used as a rear wheel drive unit, another drive unit, i.e., a front wheel drive unit, powered by an engine is provided for the front wheels. During high-speed travel in which engine efficiency is high, the front wheel drive unit is used as a drive source. Furthermore, the state of the braking means of the rear wheel drive unit is switched from its engaged state to its released state to prevent the first and second electric motors 2A and 2B from rotating at over speed.

In recent years, demands for energy saving and improvement in fuel efficiency, demands for improvement in comfort, etc. have been increasing, and the vehicle drive device described in JP-A-2010-235051 also has room for improvement in controllability.

SUMMARY OF THE INVENTION

It is one of objects of the present invention to provide a vehicle drive device excellent in controllability.

According to a first aspect of the present invention, there is provided a vehicle drive device (for example, a rear wheel drive unit 1 according to an embodiment described later) comprising: a left wheel drive unit comprising: a first electric motor (for example, a first electric motor 2A according to the embodiment described later) that drives a left wheel (for example, a left rear wheel LWr according to the embodiment described later) of a vehicle; a first speed changer (for example, a first planetary gear reducer 12A according to the embodiment described later) disposed on a power transmission path between the first electric motor and the left wheel; a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a power transmission path between the second electric motor and the right wheel; an electric motor controller (for example, a controller 8 according to the embodiment described later) that controls the first electric motor and the second electric motor. Each of the first and second speed changers comprises first to third rotation elements, the first electric motor is connected to the first rotation element (for example, a sun gear 21A according to the embodiment described later) of the first speed changer, the second electric motor is connected to the first rotation element (for example, a sun gear 21B according to the embodiment described later) of the second speed changer, the left wheel is connected to the second rotation element (for example, a planetary carrier 23A according to the embodiment described later) of the first speed changer, the right wheel is connected to the second rotation element (for example, a planetary carrier 23B according to the embodiment described later) of the second speed changer, the third rotation element (for example, a ring gear 24A according to the embodiment described later) of the first speed changer and the third rotation element (for example, a ring gear 24B according to the embodiment described later) of the second speed changer are connected to each other. The vehicle drive device further comprises: a rotation restrictor (for example, hydraulic brakes 60A and 60B according to the embodiment described later) capable of being released and locked and configured to restrict the rotations of the third rotation elements when being locked; and a state switching unit (for example, the controller 8 according to the embodiment described later) configured to switch between a free state (for example, a ring-free state according to the embodiment described later) of the third rotation elements and a restricted state (for example, a ring-locking state according to the embodiment described later) of the third rotation elements, wherein the state switching unit releases the third rotation elements in the free state, and the state switching unit locks the third rotation elements in the restricted state.

When the state switching unit switches from the restricted state to the free state, the electric motor controller performs control such that a free-state limit torque, which is a limit torque of the first electric motor or the second electric motor (for example, a ring-free limit torque according to the embodiment described later) after switching to the free state is set to a value larger in absolute value than an upper limit torque (for example, an upper limit torque according to the embodiment described later) of the first electric motor or the second electric motor determined by electric motor specifications at the time of switching or is set to a value larger in absolute value than a restricted state limit torque (for example, a ring-locking limit torque according to the embodiment described later) at the time of switching, wherein the restricted state limit torque is a limit torque of the first electric motor or the second electric motor, which is set to a value smaller in absolute value than the upper limit torque, and performs control such that the torque generated by the first electric motor or the second electric motor is less than the free-state limit torque.

According to a second aspect of the present invention, there is provided a vehicle drive device (for example, a rear wheel drive unit 1 according to an embodiment described later) comprising: a left wheel drive unit comprising: a first electric motor (for example, a first electric motor 2A according to the embodiment described later) that drives a left wheel (for example, a left rear wheel LWr according to the embodiment described later) of a vehicle; a first speed changer (for example, a first planetary gear reducer 12A according to the embodiment described later) disposed on a power transmission path between the first electric motor and the left wheel; a right wheel drive unit comprising: a second electric motor (for example, a second electric motor 2B according to the embodiment described later) that drives a right wheel (for example, a right rear wheel RWr according to the embodiment described later) of the vehicle; and a second speed changer (for example, a second planetary gear reducer 12B according to the embodiment described later) disposed on a power transmission path between the second electric motor and the right wheel; an electric motor controller (for example, a controller 8 according to the embodiment described later) that controls the first electric motor and the second electric motor. Each of the first and second speed changers comprises Ent to third rotation elements, the first electric motor is connected to the first rotation element (for example, a sun gear 21A according to the embodiment described later) of the first speed changer, the second electric motor is connected to the first rotation element (for example, a sun gear 21B according to the embodiment described later) of the second speed changer, the left wheel is connected to the second rotation element (for example, a planetary carrier 23A according to the embodiment described later) of the first speed changer, the right wheel is connected to the second rotation element (for example, a planetary carrier 23B according to the embodiment described later) of the second speed changer, the third rotation element (for example, a ring gear 24A according to the embodiment described later) of the first speed changer and the third rotation element (for example, a ring gear 24B according to the embodiment described later) of the second speed changer are connected to each other. The vehicle drive device further comprises: a rotation restrictor (for example, hydraulic brakes 60A and 60B according to the embodiment described later) capable of being released and locked and configured to restrict the rotations of the third rotation elements when being locked; and a state switching unit (for example, the controller 8 according to the embodiment described later) configured to switch between a free state (for example, a ring-free state according to the embodiment described later) of the third rotation elements and a restricted state (for example, a ring-locking state according to the embodiment described later) of the third rotation elements, wherein the state switching unit releases the rotation restrictor in the free state, and the state switching unit locks the rotation restrictor in the restricted state. The rotation restrictor releases the third rotation elements in the free state, and the rotation restrictor locks the third rotation elements in the restricted state. When the state switching unit switches from the restricted state to the free state, the electric motor controller performs control such that a free-state limit torque, which is a limit torque of the first electric motor or the second electric motor (for example, a ring-free limit torque according to the embodiment described later) after switching to the free state is set to a value larger in absolute value than an upper limit torque (for example, an upper limit torque according to the embodiment described later) of the first electric motor or the second electric motor determined by electric motor specifications at the time of switching or is set to a value larger in absolute value than a restricted state limit torque (for example, a ring-locking limit torque according to the embodiment described later) at the time of switching, wherein the restricted state limit torque is a limit torque of the first electric motor or the second electric motor, which is set to a value smaller in absolute value than the upper limit torque, and performs control such that the torque generated by the first electric motor or the second electric motor is less than the free-state limit torque.

According to a third aspect of the present invention, the state switching unit is configured to switch between the free state and the restricted state based on a first reference value, wherein the first reference value is selected from any one of following values: i) a rotation state amount related value of the first electric motor (for example, the detection value of a resolver or the rotation speed of the sun gear 21A according to the embodiment described later); ii) a rotation state amount related value of the second electric motor (for example, the detection value of the resolver or the rotation speed of the sun gear 21B according to the embodiment described later); iii) a rotation state amount related value of the left wheel (for example, the detection value of a wheel speed sensor or the rotation speed of the planetary carrier 23A according to the embodiment described later); iv) a rotation state amount related value of the right wheel (for example, the detection value of the wheel speed sensor or the rotation speed of the planetary carrier 23B according to the embodiment described later); and v) a speed of the vehicle (for example, vehicle speed according to the embodiment described later). The state switching unit is configured to switch between the free state and the restricted state based on second to fourth reference values as well as the first reference value, wherein the second reference value is selected from any one of following values: i) a torque state amount related value of the first electric motor (for example, motor torque, motor drive power or motor current according to the embodiment described later); a torque state amount related value of the second electric motor (for example, motor torque, motor drive power or motor current according to the embodiment described later); a torque state amount related value of the left wheel (for example, wheel torque or wheel drive power according to the embodiment described later); and iv) a torque state amount related value of the right wheel (for example, wheel torque or wheel drive power according to the embodiment described later). The third reference value is a turning state amount related value of the vehicle (for example, yaw moment, under-steering or over-steering according to the embodiment described later). The fourth reference value is selected any one of a lateral acceleration related value of the vehicle (for example, lateral acceleration or lateral force according to the embodiment described later) and a road surface friction state related value (for example, road surface resistance or slip state amount according to the embodiment described later).

According to a fourth aspect of the present invention, when the second reference value is equal to or more than a predetermined value, the state switching unit releases the rotation restrictor so as to switch from the restricted state to the free state.

According to a fifth aspect of the present invention, the state switching unit gives priority to the switching based on the first reference value over the switching based on the second reference value.

According to a sixth aspect of the present invention, the state switching unit locks the rotation restrictor based on a first reference value so as to switch to the restricted state. The first reference value is selected from any one of following values: 1) a rotation state amount related value of the first electric motor (for example, the detection value of a resolver or the rotation speed of the sun gear 21A according to the embodiment described later); ii) a rotation state amount related value of the second electric motor (for example, the detection value of the resolver or the rotation speed of the sun gear 21B according to the embodiment described later); iii) a rotation state amount related value of the left wheel (for example, the detection value of a wheel speed sensor or the rotation speed of the planetary carrier 23A according to the embodiment described later); iv) a rotation state amount related value of the right wheel (for example, the detection value of the wheel speed sensor or the rotation speed of the planetary carrier 23B according to the embodiment described later); and v) the speed of the vehicle (for example, vehicle speed according to the embodiment described later). The state switching unit releases the rotation restrictor based on a reference value other than the first reference value so as to switch from the restricted state to the free state.

According to a seventh, aspect of the present invention, the reference value other than the first reference value is at least one of a second reference value, a third reference value and a fourth reference value, wherein the third reference value is selected from any one of following values: i) a torque state amount related value of the first electric motor (for example, motor torque, motor drive power or motor current according to the embodiment described later); ii) a torque state amount related value of the second electric motor (for example, motor torque, motor drive power or motor current according to the embodiment described later); iii) a torque state amount related value of the left wheel (for example, wheel torque or wheel drive power according to the embodiment described later); and iv) a torque state amount related value of the right wheel (for example, wheel torque or wheel drive power according to the embodiment described later), wherein the third reference value is a turning state amount related value of the vehicle (for example, yaw moment, under-steering or over-steering according to the embodiment described later), and wherein the fourth reference value is selected from any one of a lateral acceleration related value of the vehicle (for example, lateral acceleration or lateral force according to the embodiment described later) and a road surface friction state related value (for example, road surface resistance or slip state amount according to the embodiment described later).

According to the first aspect of the present invention, in the free state of the third rotation elements, the correlation between the rotation speeds of the electric motors and the rotation speeds of the wheels is lost, and on the other band, the motor torques being equal in absolute value but opposite in direction can be transmitted to the left and right wheels. In view of this, the limit torque in the free state of the third rotation elements is made higher than the limit torque in the free state of the third rotation elements, whereby the driving stability of the vehicle can be improved. In this specification, the driving stability of the vehicle is a term representing two facets, that is, maneuverability allowing the driver to operate the vehicle as desired and traveling performance allowing the vehicle to travel stably against disturbance.

According to the second aspect of the present invention, in the free state of the third rotation elements, the correlation between the rotation speeds of the electric motors and the rotation speeds of the wheels is lost, and on the other hand, the motor torques being equal in absolute value but opposite in direction can be transmitted to the left and right wheels. In the case that the limit torque in the free state of the third rotation elements is set so as to be substantially equal to the limit torque in the restricted state of the third rotation elements, the sudden change in torque at the time of the switching from the engaged state to the released state of the rotation restrictor can be suppressed.

According to the third aspect of the present invention, the switching is performed between the restricted state of the third rotation elements and the free state of the third rotation elements based on the first reference value serving as the rotation state of the first and second electric motors, for example, whereby drive power transmission to the electric motors in the high rotation speed range of the electric motors can be shut off to prevent over speed, or drive power transmission to the electric motors in the low rotation speed range of the electric motors can be shut off to reduce the lowering of efficiency. In addition, the switching is performed between the restricted state of the third rotation elements and the free state of the third rotation elements based on the second to fourth reference values, whereby the problem of insufficient torques of the electric motors can be solved, the turning performance of the vehicle can be improved or the stability of the vehicle can be improved.

According to the fourth aspect of the present invention, since the torques that can be generated by the electric motors in the restricted state of the third rotation elements are larger than those generated in the free state thereof in the high speed range of the vehicle, the turning performance and stability of the vehicle are improved by setting the state of the third rotation elements to the free state when the torques or drive power is large.

According to the fifth aspect of the present invention, priority is given to the switching based on the first reference value, whereby damage due to over speed of the electric motors can be prevented securely.

According to the sixth aspect of the present invention, the switching is performed between the restricted state of the third rotation elements and the free state of the third rotation elements based on the first reference value serving as the rotation state of the first and second electric motors, for example, whereby drive power transmission to the electric motors in the high rotation speed range of the electric motors can be shut off to prevent over speed, or drive power transmission to the electric motors in the low rotation speed range of the electric motors can be shut off to reduce the lowering of efficiency. In addition, the switching is performed between the restricted state of the third rotation elements and the free state of the third rotation elements based on other reference values, whereby the problem of insufficient torques of the electric motors can be solved, the turning performance of the vehicle can be improved or the stability of the vehicle can be improved.

According to the seventh aspect of the present invention, the switching is performed to the free state of the third rotation elements based on the second reference value, whereby the problem of insufficient torques of the electric motors can be solved. Furthermore, the switching is performed to the free state of the third rotation elements based on the third reference value, whereby the turning performance of the vehicle can be improved. Moreover, the switching is performed to the free state of the third rotation elements based on the fourth reference value, whereby the stability of the vehicle can be improved.

BRIEF DESCRIPTION OF THE DRAWINGS

FIG. 4 is a table showing the relationship between the front wheel drive unit and the rear wheel drive unit in various vehicle states and also showing the operation states of electric motors;

FIGS. 14A to 14C are time-series speed alignment charts for the rear wheel drive unit in the case that a ring-locking state is switched to a ring-free state, wherein FIG. 14A is a speed alignment chart at the time of ring-locking control; FIG. 14B is a speed alignment chart at the time when the target torque control and the target rotation speed control are performed simultaneously in the ring-free control; and FIG. 14C is a speed alignment chart at the time when the target torque control is performed in the ring-free control;

DETAILED DESCRIPTION OF EXEMPLARY EMBODIMENTS

First, an embodiment of a vehicle drive device according to the present invention will be described based on FIGS. 1 to 3.

Figure 1:
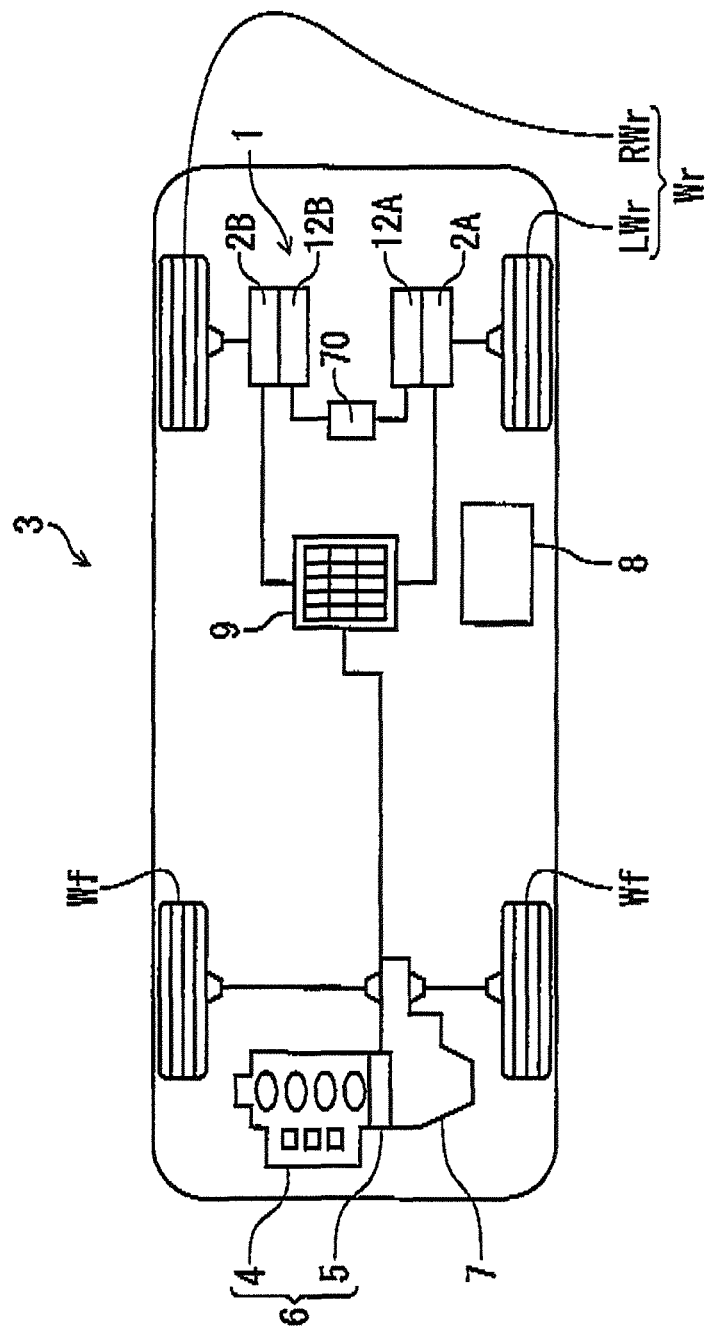
FIG. 1 is a block diagram showing a schematic configuration of a hybrid vehicle according to an embodiment of a vehicle on which a vehicle drive device according to the present invention can be mounted.

The vehicle drive device according to the present invention, in which electric motors serve as drive sources for driving axles, is used for a vehicle having such a drive system shown in FIG. 1, for example. In the following descriptions, a case in which the vehicle drive device is used to drive rear wheels is taken as an example. However, the vehicle drive device may also be used to drive front wheels.

The vehicle 3 shown in FIG. 1 is a hybrid vehicle having a drive unit 6 (hereafter referred to as a front wheel drive unit) including an internal combustion engine 4 and an electric motor 5 connected in series at the front section of the vehicle, and the drive power of this front wheel drive unit 6 is transmitted to front wheels Wf via a transmission 7; on the other hand, the drive power of a drive unit 1 (hereafter referred to as a rear wheel drive unit) provided at the rear section of the vehicle and separated from the front wheel drive unit 6 is transmitted to rear wheels Wr (RWr and LWr). The electric motor 5 of the front wheel drive unit 6 and the first and second electric motors 2A and 2B of the rear wheel drive unit 1 on the sides of the rear wheels Wr are connected to a battery 9, and electric power supply from the battery 9 and energy regeneration to the battery 9 can be performed. Numeral 8 designates a controller for variously controlling the entire vehicle.

Figure 2:
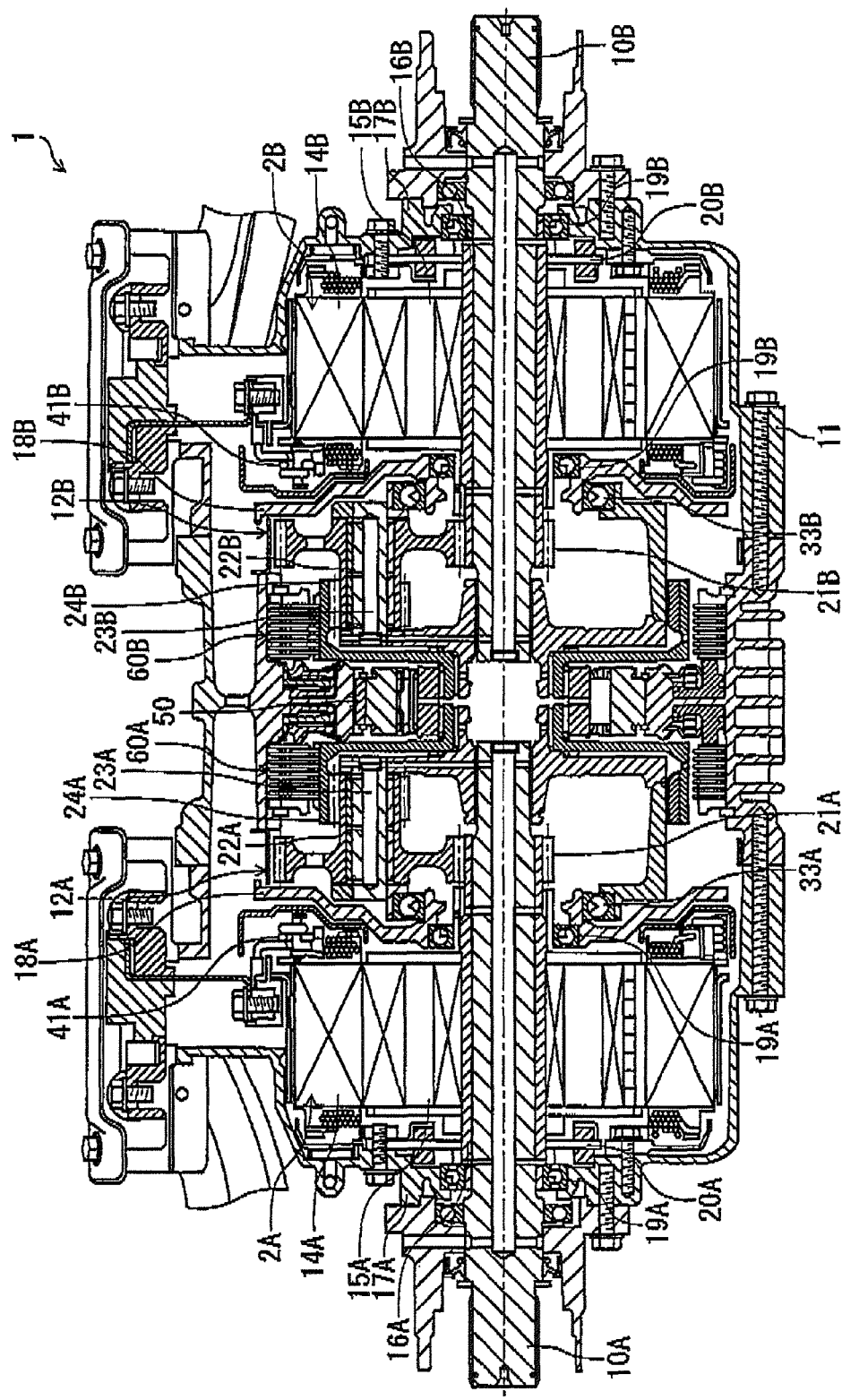
FIG. 2 is a vertical sectional view showing an embodiment of a rear wheel drive unit.
Figure 3:
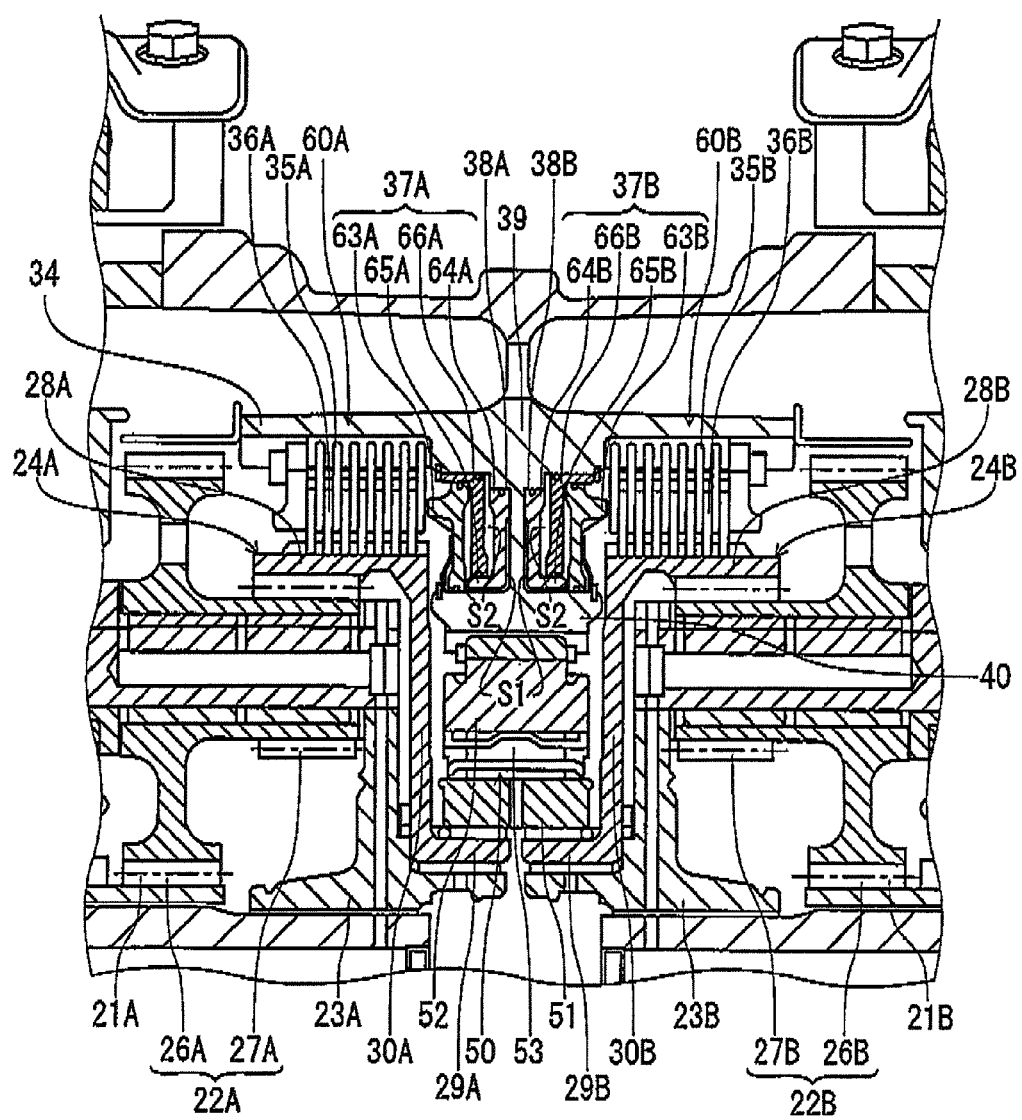
FIG. 3 is a fragmentary enlarged view showing the rear wheel drive unit shown in FIG. 2.

FIG. 2 is a vertical sectional view showing the whole structure of the rear wheel drive unit 1. In the figure, 10A and 10B designate left and right axles on the sides of the rear wheels Wr of the vehicle 3, and these axles are disposed coaxially in the width direction of the vehicle. The reducer case 11 of the rear wheel drive unit 1 is wholly formed into an approximately cylindrical shape, and in the interior thereof, the first and second electric motors 2A and 2B for driving the axles and first and second planetary gear reducers 12A and 12B for reducing the drive rotation speeds of the first and second electric motors 2A and 2B are disposed coaxially with the axles 10A and 10B. The first electric motor 2A and the first planetary gear reducer 12A function as a left wheel drive unit for driving the left rear wheel LWr, and the second electric motor 2B and the second planetary gear reducer 12B function as a right wheel drive unit for driving the right rear wheel RWr. The first electric motor 2A and the first planetary gear reducer 12A and the second electric motor 2B and the second planetary gear reducer 12B are disposed so as to be left-right symmetric in the width direction of the vehicle inside the reducer case 11.

The stators 14A and 14B of the first and second electric motors 2A and 2B are secured to the left and right end side interiors of the reducer case 11, respectively, and ring-shaped rotors 15A and 15B are rotatably disposed on the inner circumferential sides of the stators 14A and 14B. Cylindrical shafts 16A and 16B enclosing the outer circumferences of the axles 10A and 10B are connected to the inner circumferential sections of the rotors 15A and 15B, and these cylindrical shafts 16A and 16B are supported by the end walls 17A and 17B and the intermediate walls 18A and 18B of the reducer case 11 via bearings 19A and 19B so as to be coaxial with the axles 10A and 10B and relatively rotatable therewith. Furthermore, resolvers 20A and 20B for feeding back the rotation position information of the rotors 15A and 15B to the controller (not shown) of the first and second electric motors 2A and 2B are provided on the outer circumferences on one end sides of the cylindrical shafts 16A and 16B and on the end walls 17A and 17B of the reducer case 11.

Moreover, the first and second planetary gear reducers 12A and 12B include sun gears 21A and 21B, pluralities of planetary gears 22A and 22B engaged with the sun gears 21A and 21B, planetary carriers 23A and 23B for supporting these planetary gears 22A and 22B, and ring gears 24A and 24B engaged with the outer circumferential sides of the planetary gears 22A and 22B, wherein the drive power of the first and second electric motors 2A and 2B is input from the sun gears 21A and 21B and the drive power obtained after speed reduction is output via the planetary carriers 23A and 23B.

The sun gears 21A and 21B are integrated with the cylindrical shafts 16A and 16B. In addition, as shown in FIG. 3, for example, the planetary gears 22A and 22B are duplex pinions having large-diameter first pinions 26A and 26B directly engaged with the sun gears 21A and 21B and small-diameter second pinions 27A and 27B being smaller in diameter than the first pinions 26A and 26B, and the first pinions 26A and 26B and the second pinions 27A and 27B are integrated so as to be coaxial and offset in the axial direction. The planetary gears 22A and 22B are supported by the planetary carriers 23A and 23B, and the axially inner end sections of the planetary carriers 23A and 23B are extended inward in the radial direction, spline-fitted in the axles 10A and 10B and supported so as to be integrally rotatable and also supported by the intermediate walls 18A and 18B via bearings 33A and 33B.

The intermediate walls 18A and 18B are configured so as to separate electric motor accommodating spaces for accommodating the first and second electric motors 2A and 2B from reducer spaces for accommodating the first and second planetary gear reducers 12A and 12B and so as to be curved so that the mutual axial distances therebetween are increased from the outer diameter sides to the inner diameter sides thereof. Furthermore, the bearings 33A and 33B for supporting the planetary carriers 23A and 23B are disposed on the inner diameter sides of the intermediate walls 18A and 18B and on the sides of the first and second planetary gear reducers 12A and 12B. Moreover, bus rings 41A and 41B for the stators 14A and 14B are disposed on the outer diameter sides of the intermediate walls 18A and 188 and on the sides of the first and second electric motors 2A and 2B (see FIG. 2).

The ring gears 24A and 24B include gear sections 28A and 28B, the inner circumferential faces of which are engaged with the small-diameter second pinions 27A and 27B; small-diameter sections 29A and 29B being smaller in diameter than the gear sections 28A and 28B and disposed so as to be opposed to each other at the intermediate position of the reducer case 11; and connection sections 30A and 30B for connecting the axially inner end sections of the gear sections 28A and 28B to the axially outer end sections of the small-diameter sections 29A and 29B in the radial direction. In this embodiment, the maximum radius of the ring gears 24A and 24B is set so as to be smaller than the maximum distance of the first pinions 26A and 26B from the center of the axles 10A and 10B. The small-diameter sections 29A and 29B are respectively spline-fitted in the inner race 51 of a one-way clutch 50 described later, and the ring gears 24A and 24B are configured so as to be rotated integrally with the inner race 51 of the one-way clutch 50.

Cylindrical space sections are securely obtained between the reducer case 11 and the ring gears 24A and 24B, and hydraulic brakes 60A and 60B for locking the ring gears 24A and 24B are disposed inside the space sections so as to overlap the first pinions 26A and 26B in the radial direction and to overlap the second pinions 27A and 27B in the axial direction. In the hydraulic brakes 60A and 60B, pluralities of stationary plates 35A and 35B spline-fitted in the inner circumferential face of a cylindrical outer diameter side support section 34 extending in the axial direction on the inner diameter side of the reducer case 11 and plural rotation plates 36A and 36B spline-fitted in the outer circumferential faces of the ring gears 24A and 24B are disposed alternately in the axial direction, and these plates 35A, 35B, 36A and 36B are engaged and released to each other by ring-shaped pistons 37A and 37B. The pistons 37A and 37B are accommodated so as to be advanced and retracted in ring-shaped cylinder chambers 38A and 38B formed between a left-right partition wall 39 extended from the intermediate position of the reducer case 11 to the inner diameter side thereof and the outer diameter side support section 34 and an inner diameter side support section 40 connected by the left-right partition wall 39, wherein the pistons 37A and 37B are advanced by introducing high-pressure oil into the cylinder chambers 38A and 38B and retracted by discharging the oil from the cylinder chambers 38A and 38B. The hydraulic brakes 60A and 60B are connected to an electric oil pump 70 (see FIG. 1).

Furthermore, in more detail, the pistons 37A and 37B have first piston walls 63A and 63B and second piston walls 64A and 64B in the axial front-rear direction, and these piston walls 63A, 63B, 64A and 64B are connected by cylindrical inner circumferential walls 65A and 65B. Hence, ring-shaped spaces being open outward in the radial direction are formed between the first piston walls 63A and 63B and the second piston walls 64A and 64B, and the ring-shaped spaces are partitioned in the axial left-right direction by partition members 66A and 66B secured to the inner circumferential faces of the outer walls of the cylinder chambers 38A and 38B. The spaces between left-light partition wall 39 of the reducer case 11 and the second piston walls 64A and 64B are used as first actuation chambers S1 into which high-pressure oil is introduced directly, and the spaces between the partition members 66A and 66B and the first piston walls 63A and 63B are used as second actuation chambers S2 communicating with the first actuation chambers S1 via through holes formed in the inner circumferential walls 65A and 65B. The spaces between the second piston walls 64A and 64B and the partition members 66A and 663 communicate with the atmosphere.

In the hydraulic brakes 60A and 60B, oil is introduced into the first actuation chambers S1 and the second actuation chambers S2 from a hydraulic circuit, not shown, and the stationary plates 35A and 35B and the rotation plates 36A and 36B can be pressed against each other by the oil pressure acting on the first piston walls 63A and 63B and the second piston walls 64A and MB. Hence, large pressure-receiving areas can be obtained by the first and second piston walls 63A, 63B, 64A and 64B in the axial left-right direction, whereby large press forces for the stationary plates 35A and 35B and the rotation plates 36A and 36B can be obtained while the radial areas of the pistons 37A and 37B are suppressed.

In the case of the hydraulic brakes 60A and 60B, the stationary plates 35A and 35B are supported by the outer diameter side support section 34 extended from the reducer case 11, and the rotation plates 36A and 36B are supported by the ring gears 24A and 24B. Hence, when the plates 35A and 36A and the plates 35B and 36B are pressed by the pistons 37A and 37B, braking forces are applied to lock the ring gears 24A and 24B by the frictional engagement between the plates 35A and 36A and between the plates 35B and 36B. When the engagement by the pistons 37A and 37B is released from the state, the ring gears 24A and 24B are allowed to rotate freely.

In other words, at the time of the engagement, the hydraulic brakes 60A and 60B lock the ring gears 24A and 24B, whereby the power transmission path between the first and second electric motors 2A and 23 and the rear wheels Wr is set to a connection state in which power transmission is possible. At the time of the releasing, the ring gears 24A and 24B are allowed to rotate, and the bower transmission path between the first and second electric motors 2A and 2B and the rear wheels Wr. is set to a disconnection state in which power transmission is impossible.

Furthermore, a space section is securely obtained between the connection sections 30A and 30B of the ring gears 24A and 24B opposed in the axial direction, and the one-way clutch 50 for transmitting the drive power to the ring gears 24A and 24B in only one direction and for shutting off the transmission of the drive power in the other direction is disposed in the space section. The one-way clutch 50 is formed of a plurality of sprags 53 interposed between the inner race 51 and the outer race 52 thereof, and the inner race 51 is configured so as to be integrally rotated with the small-diameter sections 29A and 29B of the ring gears 24A and 24B by virtue of spline fitting. In other words, the ring gear 24A and the ring gear 24B are connected to each other by the inner race 51 so as to be integrally rotatable. Moreover, the outer race 52 is positioned by the inner diameter side support section 40 and prevented from being rotated.

When the vehicle 3 travels forward by virtue of the drive power of the first and second electric motors 2A and 2B, the one-way clutch 50 is configured so as to engage, thereby locking the rotations of the ring gears 24A and 24B. More specifically, the one-way clutch 50 is held in its engaged state when the torques in the forward direction (the rotation direction when the vehicle 3 is moved forward) on the sides of the first and second electric motors 2A and 2B are input to the rear wheels Wr. The one-way clutch 50 is held in its disengaged state when the torques in the reverse direction on the sides of the first and second electric motors 2A and 2B are input to the rear wheels Wr. Furthermore, the one-way clutch 50 is held in its disengaged state when the torques in the forward direction on the sides of the rear wheels Wr are input to the first and second electric motors 2A and 2B, and the one-way clutch 50 is held in its engaged state when the torques in the reverse direction on the sides of the rear wheels Wr are input to the first and second electric motors 2A and 2B. In other words, at the time of the disengagement, the one-way clutch 50 allows the ring gears 24A and 24B to be rotated in one direction by the reversely-oriented torques of the first and second electric motors 2A and 2B. At the time of the engagement, the one-way clutch 50 restricts the ring gears 24A and 24B from being rotated in the reverse direction by the forwardly-oriented torques of the first and second electric motors 2A and 2B. The reversely-oriented torque is the torque acting in the reverse direction in which the rotation in the reverse direction is increased or the torque acting in the reverse direction in which the rotation in the forward direction is decreased.

As described above, in the rear wheel drive unit 1 according to this embodiment, the one-way clutch 50 and the hydraulic brakes 60A and 60B are provided in parallel on the power transmission paths between the first and second electric motors 2A and 2B and the rear wheels Wr. Both the hydraulic brakes 60A and 60B are not necessarily required to be provided. One hydraulic brake may be provided in one space and the other space may be used as a breather chamber.

The controller 8 (see FIG. 1) is a controller for variously controlling the entire vehicle. The speed sensor values of the wheels, the motor rotation speed sensor values of the first and second electric motors 2A and 2B, the steering angle of the steering wheel, the opening AP of the accelerator pedal, the position of the shift, the charged state (SOC) of the battery 9, oil temperature, etc. are input to the controller 8. On the other hand, signals for controlling the internal combustion engine 4, signals for controlling the first and second electric motors 2A and 23, signals for controlling the electric oil pump 70, etc. are output from the controller 8.

In other words, the controller 8 is at least equipped with a function of serving as electric motor controller for controlling the first and second electric motors 2A and 2B and a function of serving as state switching unit for switching the state of the hydraulic brakes 60A and 60B serving as rotation restrictor between the engaged state and the released state thereof.

FIG. 4 is a view showing the relationship between the front wheel drive unit 6 and the rear wheel drive unit 1 in various vehicle states and also showing the operation states of the first and second electric motors 2A and 23. In the figure, "front unit" designates the front wheel drive unit 6, "rear unit" designates the rear wheel drive unit 1, "rear motor" designates the first and second electric motors 2A and 2B, "OWC" designates the one-way clutch 50, and "BRK" designates the hydraulic brakes 60A and 60B. In addition, FIGS. 5 to 10 and FIGS. 12 to 17 are speed alignment charts in various states of the rear wheel drive unit 1. "LMOT" designates the first electric motor 2A and "RIOT" designates the second electric motor 2B. "S" and "C" on the left side designate the sun gear 21A of the first planetary gear reducer 12A connected to the first electric motor 2A and the planetary carrier 23A of the first planetary gear reducer 12A, respectively, and "S" and "C" on the right side designate the sun gear 21B of the second planetary gear reducer 12B and the planetary carrier 23B of the second planetary gear reducer 12B. "R" designates the ring gears 24A and 24B of the first and second planetary gear reducers 12A and 12B, "BRK" designates the hydraulic brakes 60A and 60B, and "OWC" designates the one-way clutch 50. In the following descriptions, the rotation direction of the sun gears 21A and 21B at the time of forward travel of the vehicle using the first and second electric motors 2A and 2B is assumed to be the forward direction. In addition, in each figure, the upper portion thereof represents the rotation in the forward direction from the stop state of the vehicle and the lower portion thereof represents the rotation in the reverse direction. Furthermore, an upward arrow indicates a torque in the forward direction and a downward arrow indicates a torque in the reverse direction.

Figure 5:
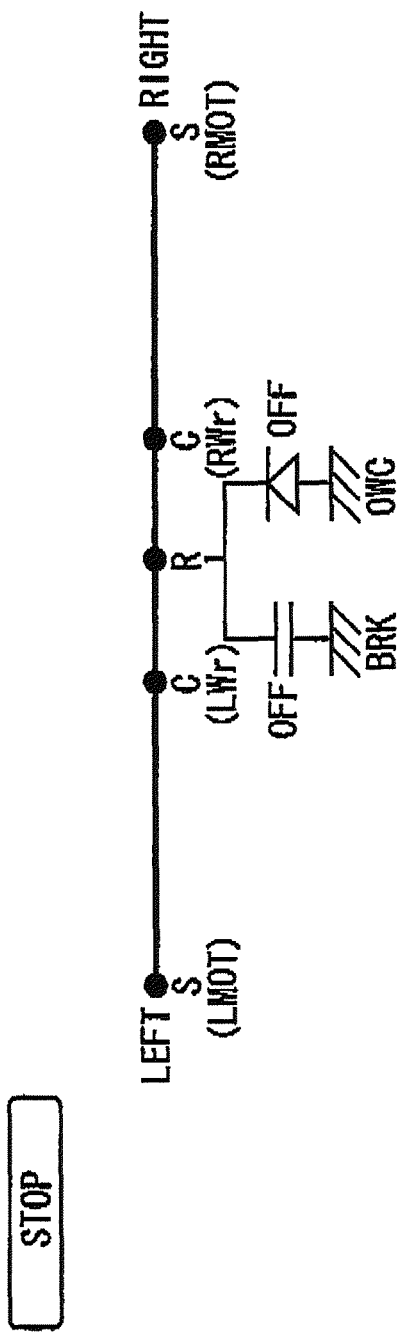
FIG. 5 is a speed alignment chart for the rear wheel drive unit at the stop time of the vehicle.

At the stop time of the vehicle, the front wheel drive unit 6 and the rear wheel drive unit 1 do not perform driving. Hence, as shown in FIG. 5, the first and second electric motors 2A and 2B of the rear wheel drive unit 1 are stopped, and the axles 10A and 10B are also stopped, whereby no torque is applied to these components. At this time, the hydraulic brakes 60A and 60B are released (OFF). Furthermore, the one-way clutch 50 is not engaged (OFF) because the first and second electric motors 2A and 2B are not driven.

Figure 6:
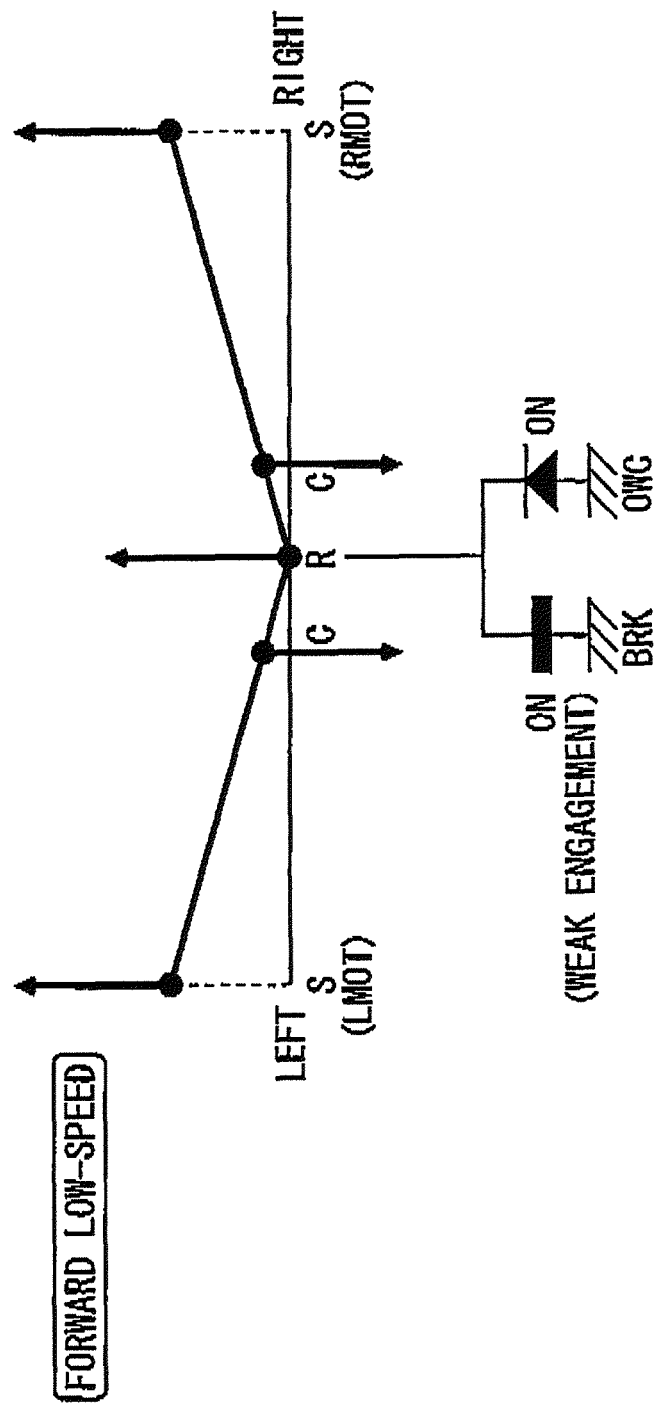
FIG. 6 is a speed alignment chart for the rear wheel drive unit at the time of forward low-speed travel of the vehicle.

Then, after the key position of the vehicle is set to ON, the rear wheels are driven by the rear wheel drive unit 1 at the time of forward low-speed travel, such as EV start or EV cruise, in which motor efficiency is high. As shown in FIG. 6, when power drive is performed so that the first and second electric motors 2A and 2B rotate in the forward direction, forward direction torques are applied to the sun gears 21A and 21B. At this time, as detailed above, the one-way clutch 50 is engaged and the ring gears 24A and 24B are locked. Hence, the planetary carriers 23A and 23B rotate in the forward direction and the vehicle travels forward. Travel resistance from the axles 10A and 10B is applied to the planetary carriers 23A and 23B in the reverse direction. In this way, at the start time of the vehicle 3, the key position is set to ON and the torques of the electric motors 2A and 2B are raised, whereby the one-way clutch 50 is engaged mechanically and the ring gears 24A and 24B are locked.

At this time, the hydraulic brakes 60A and 60B are controlled to a weakly engaged state. The weakly engaged state is a state in which engagement is performed with weak engagement forces smaller than the engagement forces obtained in the engaged state of the hydraulic brakes 60A and 60B and power transmission is possible. When the forward torques of the first and second electric motors 2A and 2B are input to the rear wheels Wr, the one-way clutch 50 is engaged, and power transmission can be performed using only the one-way clutch 50. However, in, the case that the hydraulic brakes 60A and 60B provided in parallel with the one-way clutch 50 are set to the weakly engaged state so that the first and second electric motors 2A and 2B are set to the state of being connected to the rear wheels Wr, even if the input levels of the forward torques from the first and second electric motors 2A and 2B become lower temporarily and the one-way clutch 50 is disengaged, it is possible to suppress the transmission of the drive power between the first and second electric motors 2A and 2B and the rear wheels Wr from becoming disabled. Furthermore, when the travel mode of the vehicle is switched to deceleration regeneration described later, it is not necessary to perform rotation speed control for setting the first and second electric motors 2A and 2B to the state of being connected to the rear wheels Wr. Since the engagement forces of the hydraulic brakes 60A and 60B at the time when the one-way clutch 50 is engaged are made weaker than the engagement forces of the hydraulic brakes 60A and 60B at the time when the one-way clutch 50 is disengaged, energy to be consumed for engaging the hydraulic brakes 60A and 60B is reduced. Since the one-way clutch 50 is engaged or the hydraulic brakes 60A and 60B are engaged, the ring gears 24A and 24B are restricted from being rotated freely (this state is hereafter referred to as a ring-locking state), and in the following descriptions, the drive control for the first and second electric motors 2A and 2B in a state in which the first and second electric motors 2A and 2B are connected to the rear wheels Wr and the drive power can be transmitted thereto is also referred to as ring-locking control.

Figure 7:
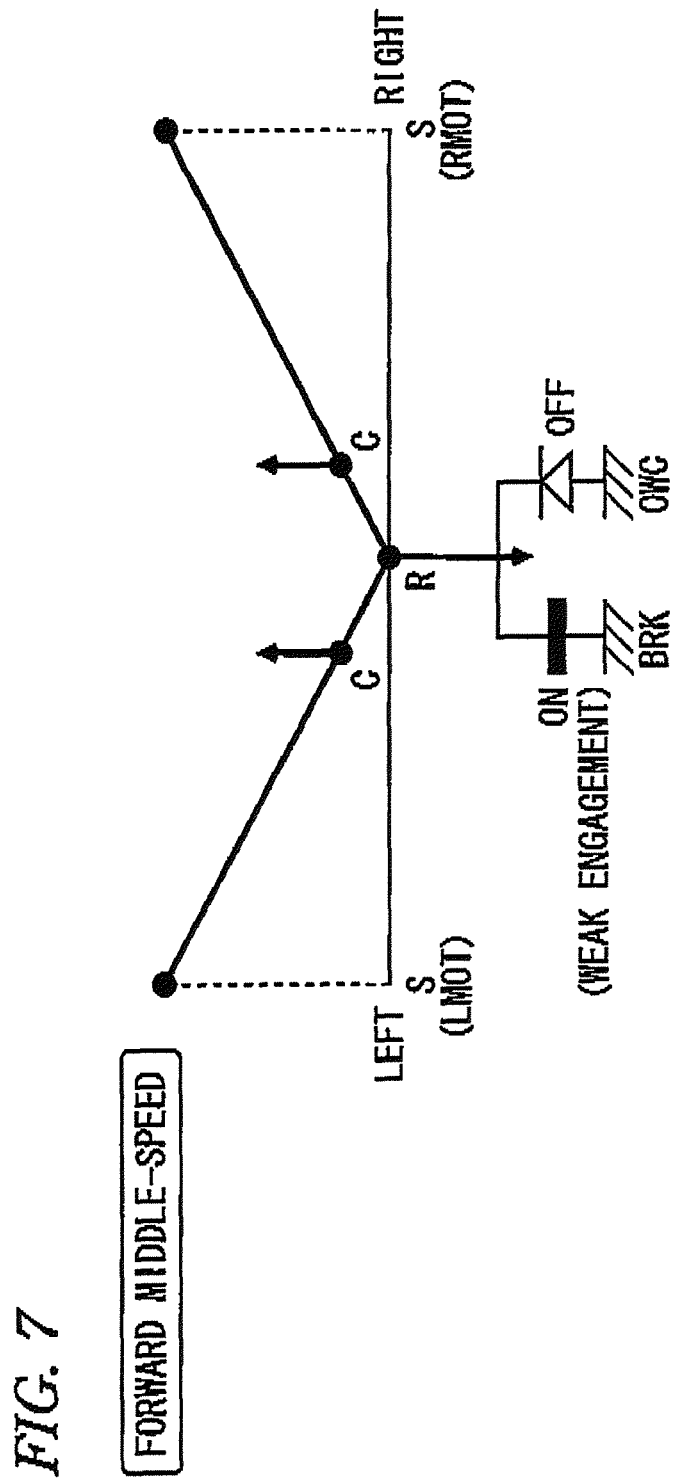
FIG. 7 is a speed alignment chart for the rear wheel drive unit at the time of forward middle-speed travel of the vehicle.

When the vehicle speed increases from the speed of the forward low-speed travel to the speed of the forward middle-speed travel in which engine efficiency is high, rear-wheel drive using the rear wheel drive unit 1 is shifted to front-wheel drive using the front wheel drive unit 6. As shown in FIG. 7, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the hydraulic brakes 60A and 60B are also controlled so as to be set to the weakly engaged state.

Figure 8:
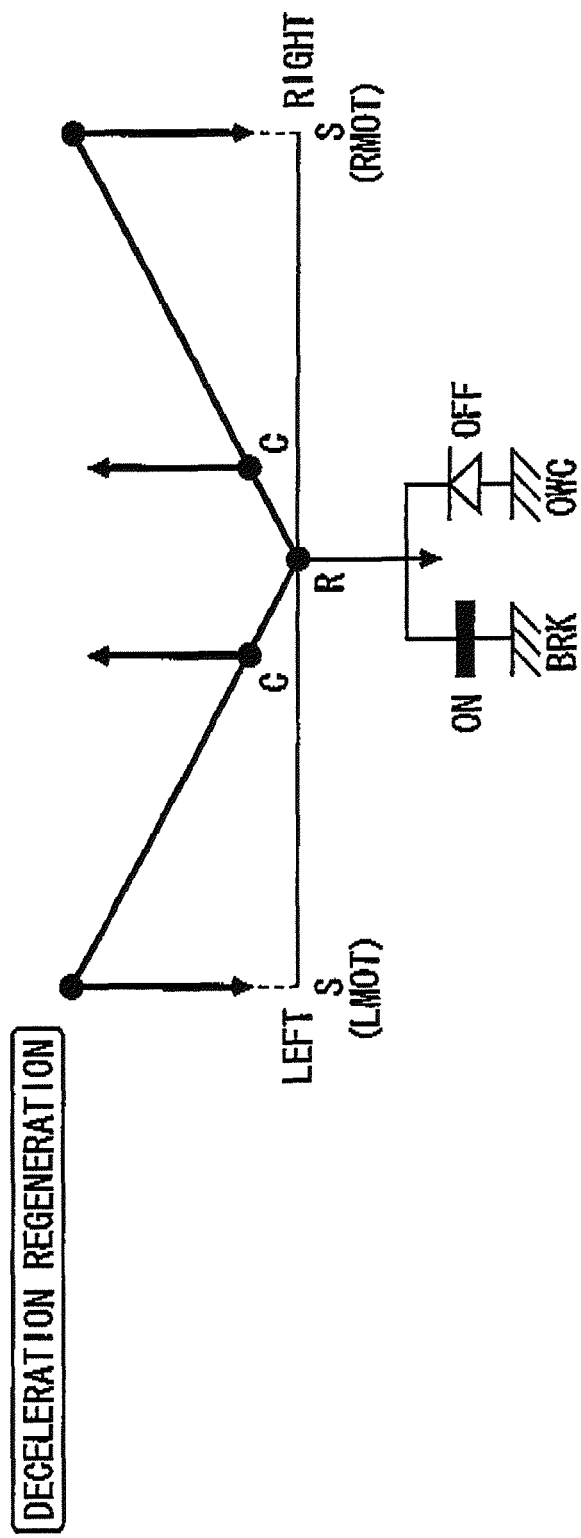
FIG. 8 is a speed alignment chart for the rear wheel drive unit at the time of deceleration regeneration.

When the first and second electric motors 2A and 2B being in the state shown in FIG. 6 or 7 are driven by regeneration, the forward torques for continuing forward travel are exerted from the axles 10A and 10B to the planetary carriers 23A and 23B as shown in FIG. 8, whereby the one-way clutch 50 is disengaged as described above. At this time, the hydraulic brakes 60A and 60B are controlled so as to be set to the engaged state (ON). Hence, the ring gears 24A and 24B are locked, regenerative braking torques in the reverse direction are exerted to the first and second electric motors 2A and 2B, and deceleration regeneration is performed in the first and second electric motors 2A and 2B. When the forward torques on the side of the rear wheels Wr are input to the first and second electric motors 2A and 2B as described above, the one-way clutch 50 is disengaged, and power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in, which power transmission is possible can be maintained. In this state, the first and second electric motors 2A and 2B are controlled so as to be set to a regenerative drive state, whereby the energy of the vehicle 3 can be regenerated.

Then, at the time of acceleration, four-wheel drive is carried out using the front wheel drive unit 6 and the rear wheel drive unit 1. The state of the rear wheel drive unit 1 is the same as that at the time of forward low-speed travel.

At the time of forward high-speed travel, front-wheel drive using the front wheel drive unit 6 is performed. At this time, control is performed to stop the first and second electric motors 2A and 2B and to release the hydraulic brakes 60A and 60B. Since the forward torques on the side of the rear wheels Wr are input to the first and second electric motors 2A and 2B, the one-way clutch 50 is disengaged, and the hydraulic brakes 60A and 60B are controlled so as to be set to the released state, whereby the ring gears 24A and 24B starts rotating.

Figure 9:
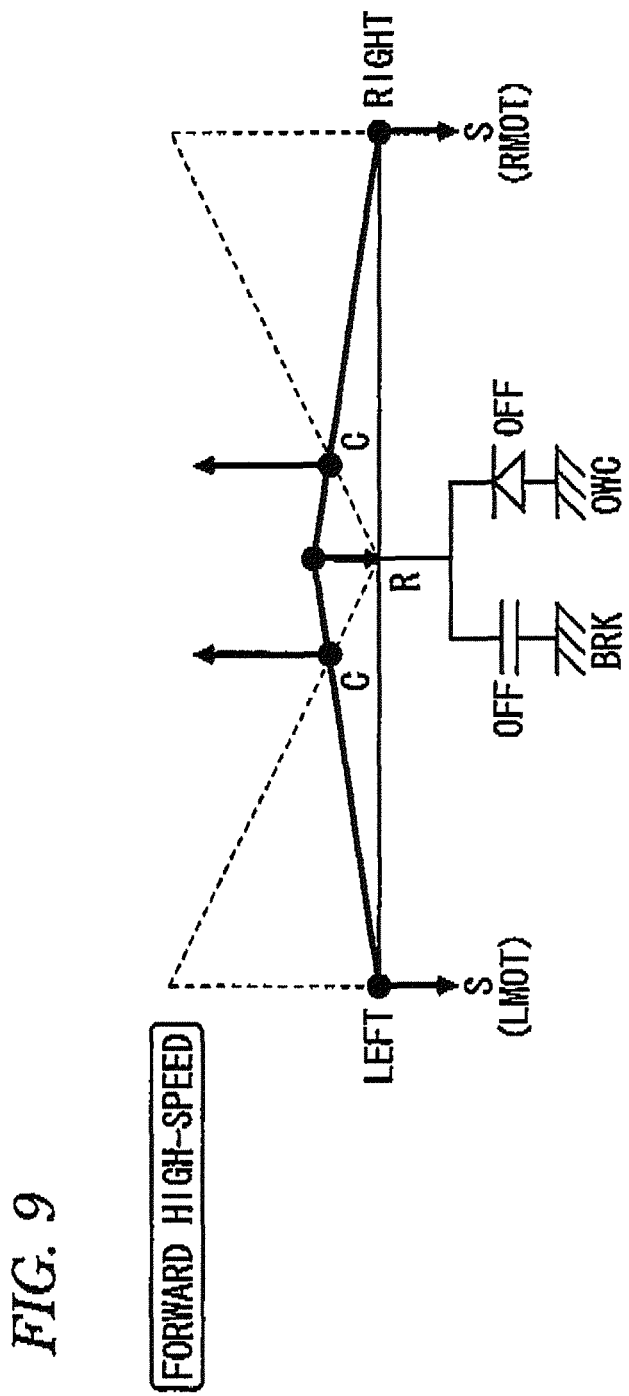
FIG. 9 is a speed alignment chart for the rear wheel drive unit at the time of forward high-speed travel time of the vehicle.

As shown in FIG. 9, when the power drive of the first and second electric motors 2A and 2B is stopped, forward torques for performing forward travel are exerted from the axles 10A and 10B to the planetary carriers 23A and 23B, whereby the one-way clutch 50 is disengaged as described above. At this time, the rotation losses of the sun gears 21A and 21B and the first and second electric motors 2A and 2B are input to the sun gears 21A and 21B as a resistance, and the rotation losses of the ring gears 24A and 24B are generated in the ring gears 24A and 24B.

The ring gears 24A and 24B are allowed to rotate freely (hereafter referred to as a ring-free state) by performing control to set the hydraulic brakes 60A and 60B to the released state, whereby the first and second electric motors 2A and 2B are disconnected from the rear wheels Wr and power transmission cannot be performed. Hence, accompanied rotations of the first and second electric motors 2A and 2B are prevented. In addition, over speed of the first and second electric motors 2A and 2B is prevented at the time of high-speed travel using the front wheel drive unit 6. In the above description, the first and second electric motors 2A and 2B are stopped in the ring-free state. However, the first and second electric motors 2A and 2B may be driven in the ring-free state (hereafter referred to as ring-free control). The ring-free control will be described later.

Figure 10:
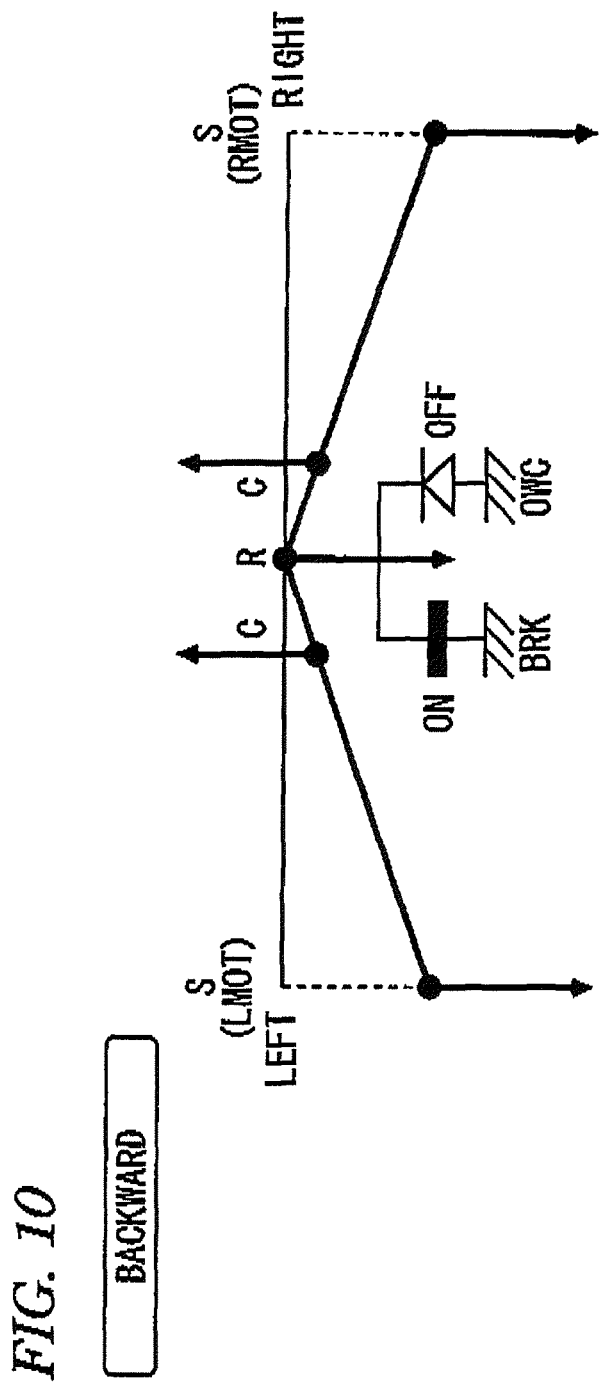
FIG. 10 is a speed alignment chart for the rear wheel drive unit at the time of backward travel of the vehicle.

At the time of backward travel, as shown in FIG. 10, when the first and second electric motors 2A and 2B are subjected to reverse power drive, reverse torques are applied to the sun gears 21A and 21B. At this time, the one-way clutch 50 is disengaged as described above.

At this time, control is performed to set the hydraulic brakes 60A and 60B to the engaged state (ON). Hence, the ring gears 24A and 24B are locked, and the planetary carriers 23A and 23B are rotated in the reverse direction, and backward travel is performed. The travel resistance from the axles 10A and 10B is exerted to the planetary carriers 23A and 23B in the forward direction. When the reverse torques from the first and second electric motors 2A and 2B are input to the rear wheels Wr as described above, the one-way clutch 50 is disengaged, and the drive power cannot be transmitted using only the one-way clutch 50. However, in the case that the hydraulic brakes 60A and 60B provided in parallel with the one-way clutch 50 are engaged and the first and second electric motors 2A and 2B are set to the state of being connected to the rear wheels Wr, the state in which power transmission is possible can be maintained, and the vehicle 3 can be moved backward using the torques of the first and second electric motors 2A and 2B.

As described above in the rear wheel drive unit 1, control is performed so that the hydraulic brakes 60A and 60B are engaged or released depending on the travel state of the vehicle, in other words, depending on whether the rotation direction of the fast and second electric motors 2A and 2B is forward or backward and depending on whether the drive power is input from the first and second electric motors 2A and 2B or from the rear wheels Wr. Furthermore, the engagement forces of the hydraulic brakes 60A and 60B are adjusted even when the hydraulic brakes 60A and 60B are engaged.

Figure 11:
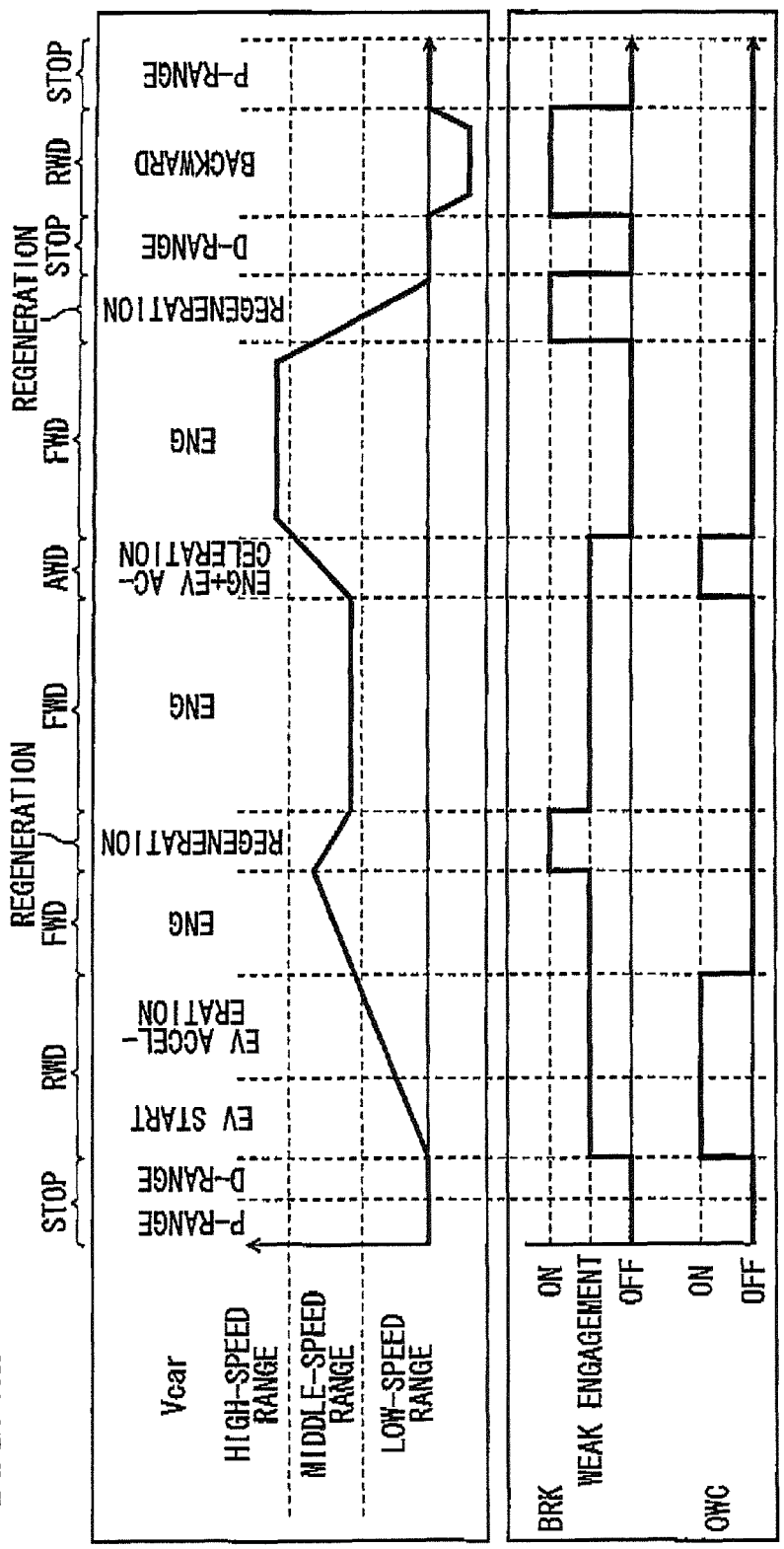
FIG. 11 is a timing chart during the travel of the vehicle.

FIG. 11 is a timing chart for the electric oil pump 70 (FOP), the one-way clutch 50 (OWC) and the hydraulic brakes 60A and 60B (BIM) when the state of the vehicle changes from the vehicle stop state to EV start, EV acceleration, ENG acceleration, deceleration regeneration, middle-speed ENG cruise, ENG+EV acceleration, high-speed ENG cruise, deceleration regeneration, vehicle stop, backward travel and vehicle stop.

First, the key position is set to ON and the shift is changed from the P-range to the D-range. Until the accelerator pedal is pressed, the one-way clutch 50 is held in the disengaged state (OFF), and the hydraulic brakes 60A and 60B are held in the released state (OFF). Then, when the accelerator pedal is pressed, EV start and EV acceleration are performed using the rear wheel drive unit 1 in the rear wheel drive mode (RWD). At this time, the one-way clutch 50 is engaged (ON), and the hydraulic brakes 60A and 60B are set to the weakly engaged state. Then, when the vehicle speed is changed from the low-speed range to the middle-speed range and the rear wheel drive mode is changed to the front wheel drive mode, ENG travel (FWD) using the internal combustion engine 4 is performed. At this time, the one-way clutch 50 is disengaged (OFF), and the state of the hydraulic brakes 60A and 60B is maintained unchanged (the weakly engaged state). Then, when deceleration regeneration is performed by pressing the brake pedal, for example, the hydraulic brakes 60A and 60B are engaged (ON) while the one-way clutch 50 remains engaged (OFF). The state during middle-speed cruise using the internal combustion engine 4 is similar to that during the above-mentioned ENG travel. Next, when the accelerator pedal is pressed further and the front wheel drive mode is changed to the four-wheel drive mode (AWD), the one-way clutch 50 is engaged (ON) again. Then, when the vehicle speed is changed from the middle-speed range to the high-speed range, the ENG travel mode (TWD) using the internal combustion engine 4 is performed again. At this time, the one-way clutch 50 is disengaged (OFF) and the hydraulic brakes 60A and 60B are released (OFF). In the case that the first and second electric motors 2A and 2B are not requested to be driven, the first and second electric motors 2A and 2B are stopped. In the case that the electric motors are requested to be driven, ring-free control described later is performed. Then, the state at the time of deceleration regeneration becomes similar to that at the time of the above-mentioned deceleration regeneration. Then, when the vehicle stops, the one-way clutch 50 is disengaged (OFF) and the hydraulic brakes 60A and 60B are released (OFF).

Next, at the time of backward travel, the hydraulic brakes 60A and 60B are engaged (ON) while the one-way clutch 50 remains disengaged (OFF). Then, when the vehicle stops, the one-way clutch 50 is disengaged (OFF) and the hydraulic brakes 60A and 60B are released (OFF).

Next, ring-free control will be described.

The ring-free control is drive control for the first and second electric motors 2A and 2B in the state that the one-way clutch 50 is disengaged and the hydraulic brakes 60A and 60B are released, in other words, in a state in which the connected ring gears 24A and 24B are allowed to rotate freely (the ring-free state). With this control, target torques can be generated in the first and second electric motors 2A and 2B (target torque control) to generate a target yaw moment (target left-right difference torque), and the first and/or second electric motors 2A and 2B can be controlled so as to rotate at target rotation speeds (target rotation speed control).

<Target Torque Control>

In the ring-free state, the first and second electric motors 2A and 2B are disconnected from the rear wheels Wr and power transmission is disabled as described above. However, in the case that control is performed so that a torque in the forward direction or the reverse direction is generated in the first electric motor 2A and so that a torque being equal in absolute value to the torque of the first electric motor 2A but opposite in direction (in the reverse direction or the forward direction) is generated in the second electric motor 2B, a left-right difference torque is generated between the left rear wheel LWr and the right rear wheel RWr without changing the rotation speeds of the first and second electric motors 2A and 2B, whereby a predetermined yaw moment can be generated.

Figure 12A:
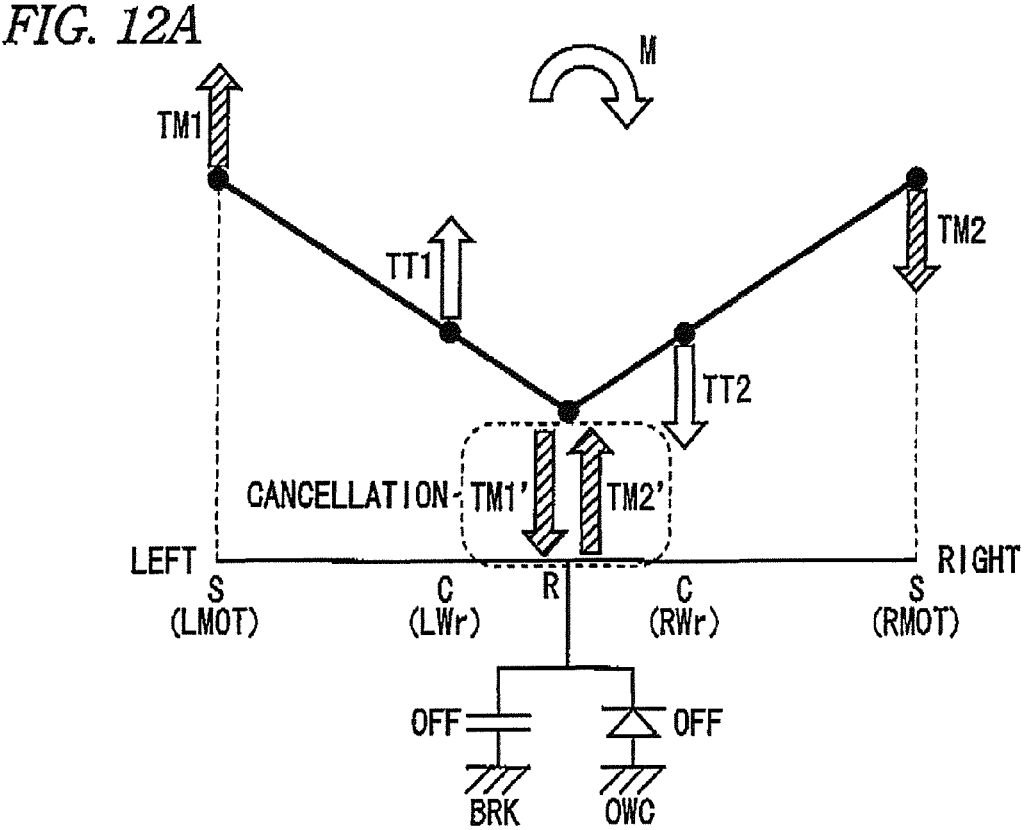
FIG. 12A is a speed alignment chart for the rear wheel drive unit at the time when target torque control is performed in ring-free control.

For example, a case in which a clockwise yaw moment M is generated in the vehicle 3 is taken as an example and specifically described referring to FIG. 12A. Torque control is performed so that a first motor base torque TM1 in the forward direction is generated in the first electric motor 2A, whereby the first motor base torque TM1 in the forward direction is exerted to the sun gear 21A. At this time, as in the case of FIG. 9, a forward torque (not shown) for making the vehicle travel forward is exerted from the axle 10A to the planetary carrier 23A. Hence, in the first planetary gear reducer 12A, the planetary carrier 23A serves as a fulcrum, and the first motor base torque TM1 in the forward direction is exerted to the sun gear 21A serving as a power point, whereby a first motor base torque distribution force TM1' in the reverse direction is exerted to the ring gears 24A and 24B serving as application points. Vectors due to losses etc. steadily applied to the respective rotation elements described above are not shown in FIG. 12 and the following figures.

On the other hand, torque control is performed so that a second motor base torque TM2 in the reverse direction is generated in the second electric motor 2B, whereby the second motor base torque TM2 in the reverse direction is exerted to the sun gear 21B. At this time, as in the case of FIG. 9, a forward torque (not shown) for making the vehicle travel forward is exerted from the axle 10B to the planetary carrier 23B. Hence, in the second planetary gear reducer 12B, the planetary carrier 23B serves as a fulcrum, and the second motor base torque TM2 in the reverse direction is exerted to the sun gear 21B serving as a power point, whereby a second motor base torque distribution force TM2' in the forward direction is exerted to the ring gears 24A and 24B serving as application points.

Since the first motor base torque TM1 and the second motor base torque TM2 are equal in absolute value but opposite in direction, the first motor base torque distribution force TM1' in the reverse direction exerted to the ring gears 24A and 24B and the second motor base torque distribution force TM2' in the forward direction also exerted to the ring gears 24A and 24B are cancelled with each other. Hence, the first motor base torque TM1 and the second motor base torque TM2 do not contribute to the change in rotation and the respective rotation states of the sun gears 21A and 21B and the ring gears 24A and 24B are maintained unchanged. At this time, a left rear wheel torque m in the forward direction obtained by multiplying the reduction ratio of the first planetary gear reducer 12A to the first motor base torque TM1 is exerted to the planetary carrier 23A, and a right rear wheel torque TT2 in the reverse direction obtained by multiplying the reduction ratio of the second planetary gear reducer 12B to the second motor base torque TM2 is exerted to the planetary carrier 23B.

Since the reduction ratios of the first and second planetary gear reducers 12A and 12B are equal, the left and right rear wheel torques TT1 and TT2 are equal in absolute value but opposite in direction. As a result, the clockwise yaw moment M depending on the difference (TT1-TT2) between the left and right rear wheel torques TT1 and TT2 is generated stably.

The target motor base torques at the time when the first and second electric motors 2A and 2B are subjected to the target torque control are obtained based on the target yaw moment of the vehicle 3. A method for obtaining the target motor base torques will be described below using the following expressions.

When it is assumed that the left rear wheel target torque of the left rear wheel LWr is WTT1, that the right rear wheel target torque of the right rear wheel RWr is WTT2, that the total target torque of the left and right rear wheels LWr and RWr (the sum of the left rear wheel torque and the right rear wheel torque) is TRT, and that the difference between the target torques of the left and right rear wheels LWr and RWr (the difference between the left rear wheel torque and the right rear wheel torque) is ΔTT, the following expressions (1) and (2) are established.

$$WTT1+WTT2=TRT \qquad (1)$$

$$WTT1-WTT2=\Delta TT \qquad (2)$$

When it is assumed that the target yaw moment (clockwise direction is positive) is YMT, that the radius of the wheel is r, and that the tread width (the distance between the left and right rear wheels LWr and RWr) is Tr, ΔTT is represented by the following expression (3).

$$\Delta TT=2\cdot r\cdot YMT/Tr \qquad (3)$$

Since the torques of the first and second electric motors 2A and 2B in the same direction are not transmitted to the rear wheels Wr in the ring-free state, the total target torque TRT of the left and right rear wheels LWr and RWr is zero. Hence, the target torques WTT1 and WTT2 of the left and right rear wheels LWr and RWr are determined uniquely by the above-mentioned expressions (1) and (2).

That is to say, $$WTT1=-WTT2=\Delta TT/2 \qquad (4)$$

Furthermore, when it is assumed that the target motor base torque of the first electric motor 2A connected to the left rear wheel LWr is TTM1 and that the target motor base torque of the second electric motor 2B connected to the right rear wheel RWr is TTM2, the target motor base torques TTM1 and TTM2 of the first and second electric motors 2A and 2B on the left and right sides are derived from the following expressions (5) and (6).

$$TTM1=(1/\text{Ratio})\cdot WTT1 \qquad (5)$$

$$TTM2=(1/\text{Ratio})\cdot WTT2 \qquad (6)$$

Ratio designates the reduction ratio of the first and second planetary gear reducers 12A and 12B.

From the above-mentioned expressions (4) to (6), the target motor base torques TTM1 and TTM2 of the first and second electric motors 2A and 2B on the left and right sides are represented by the following expressions (7) and (8).

$$TTM1=(1/\text{Ratio})\cdot \Delta TT/2 \qquad (7)$$

$$TTM2=-(1/\text{Ratio})*\Delta TT/2 \qquad (8)$$

Hence, the target torque difference ΔTT between the left and right rear wheels LWr and RWr is obtained based on the target yaw moment YMT of the vehicle 3, and the value obtained by dividing the half torque of the target torque difference ΔTT by the reduction ratio of the first planetary gear reducer 12A is set to the target motor base torques TTM1 and TTM2 of the first and second electric motors 2A and 2B being subjected to the target torque control, whereby the desired yaw moment can be generated <Target Rotation Speed Control>

In the ring-free state, that is, in the state in which the one-way clutch 50 is disengaged and the hydraulic brakes 60A and 60B are released, even if the torques in the same direction are generated from the first and second electric motors 2A and 2B, the connected ring gears 24A and 243 are not locked, and the motor torque distribution forces described above are not cancelled. Hence, no torque is transmitted to the rear wheels Wr, but only the rotation speeds of the sun gears 21A and 21B (the first and second electric motors 2A and 2B) and the ring gears 24A and 24B are changed.

In this case, the rotation control torques being equal in absolute value and having the same direction are generated in the first and second electric motors 2A and 2B. Hence, the first and/or second electric motors 2A and/or 2B can be controlled at the desired rotation speeds without transmitting the rotation control torques to the rear wheels Wr.

Figure 12B:
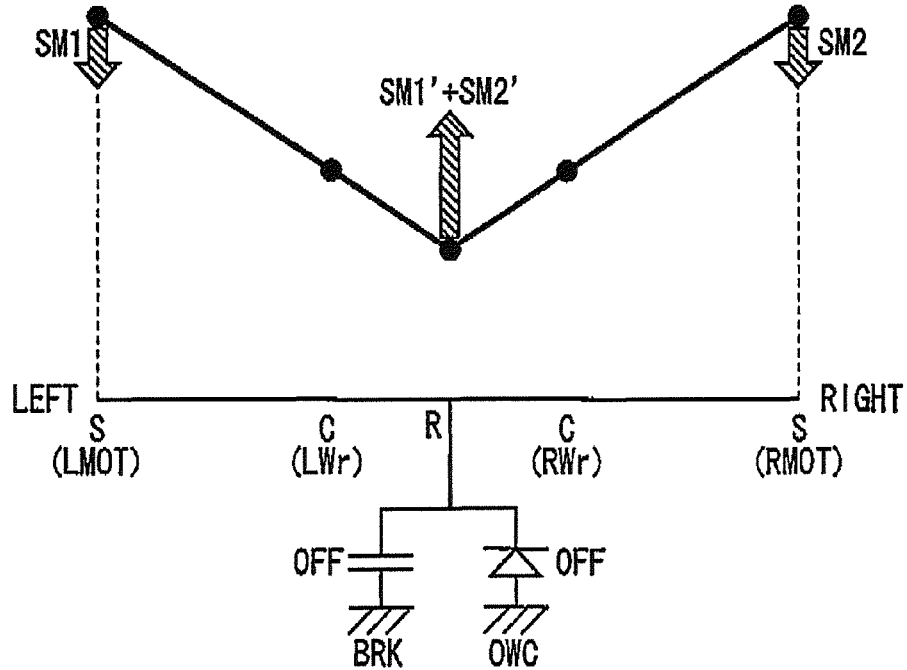
FIG. 12B is a speed alignment chart for the rear wheel drive unit at the time when target rotation speed control is performed in the ring-free control.

For example, a case in which the rotation speeds of the first and second electric motors 2A and 2B are lowered is taken as an example and specifically described referring to FIG. 12B. Torque control is performed so that a first rotation control torque SM1 in the reverse direction is generated in the first electric motor 2A, whereby the first rotation control torque SM1 in, the reverse direction is exerted to the sun gear 21A. At this time, as in the case of FIG. 9, a forward torque (not shown) for making the vehicle travel forward is exerted from the axle 10A to the planetary carrier 23A. Hence, in the first planetary gear reducer 12A, the planetary carrier 23A serves as a fulcrum, and the first rotation control torque SM1 in the reverse direction is exerted to the sun gear 21A serving as a power point, whereby a first rotation control torque distribution force SM1' in the forward direction is exerted to the ring gears 24A and 24B serving as application points.

Similarly, torque control is performed so that a second rotation control torque SM2 in the reverse direction is generated in the second electric motor 2B, whereby the second rotation control torque SM2 in the reverse direction is exerted to the sun gear 21B. At this time, as in the case of FIG. 9, a forward torque (not shown) for making the vehicle travel forward is exerted from the axle 10B to the planetary carrier 23B. Hence, in the second planetary gear reducer 12B, the planetary carrier 23B serves as a fulcrum, and the second rotation control torque SM2 in the reverse direction is exerted to the sun gear 21B serving as a power point, whereby a second rotation control torque distribution force SM2' in the forward direction is exerted to the ring gears 24A and 24B serving as application points.

Since the first and second rotation control torques SM1 and SM2 are torques being equal in absolute value and having the same direction, the first and second rotation control torque distribution forces SM1' and SM2' exerted to the ring gears 24A and 24B are also torques being equal in absolute value and having the same direction. The first and second rotation control torque distribution forces SM1' and SM2' are exerted in the direction of increasing the rotation speeds of the ring gears 24A and 24B. At this time, since torques balanced with the first and second rotation control torques SM1 and SM2 do not exist in the first and second planetary gear reducers 12A and 12B, the left and right rear wheel torques due to the first and second rotation control torques SM1 and SM2 are not generated in the planetary carriers 23A and 23B. Hence, the first and second rotation control torques SM1 and SM2 contribute only to the change in rotation and decrease the rotation speeds of the first and second electric motors 2A and 2B and the rotation speeds of the sun gears 21A and 21B. In addition, the first and second rotation control torque distribution forces SM1' and SM2' increase the rotation speed of the ring gears 24A and 24B. In the case that the first and second rotation control torques SM1 and SM2 generated appropriately as described above, the first and second electric motors 2A and 2B can be controlled to rotate at given target rotation speeds, and the rotation speeds of the first and second electric motors 2A and 2B eventually become equal to the motor target rotation speeds.

Since the ring gears 24A and 24B are connected to each other in the rear wheel drive unit 1, control cannot be performed in some cases so that the motor target rotation speed of the first electric motor 2A and the motor target rotation speed of the second electric motor 2B are satisfied simultaneously. In such a case, one of the electric motors is subjected to the target rotation speed control so that the target rotation speed control of either one of the electric motors is satisfied.

<Target Torque Control+Target Rotation Speed Control>

FIGS. 12A and 12B separately illustrate the target torque control in which the target torques are generated in the first and second electric motors 2A and 2B so that the target yaw moment is generated, and also illustrate the target rotation speed control in which the first and second electric motors 2A and 2B are controlled so as to rotate at the target rotation speeds in the ring-free state. By virtue of these two types of control performed simultaneously, the first and second electric motors 2A and 2B can be controlled so as to rotate at the desired rotation speeds while the desired yaw moment is generated.

Figure 13:
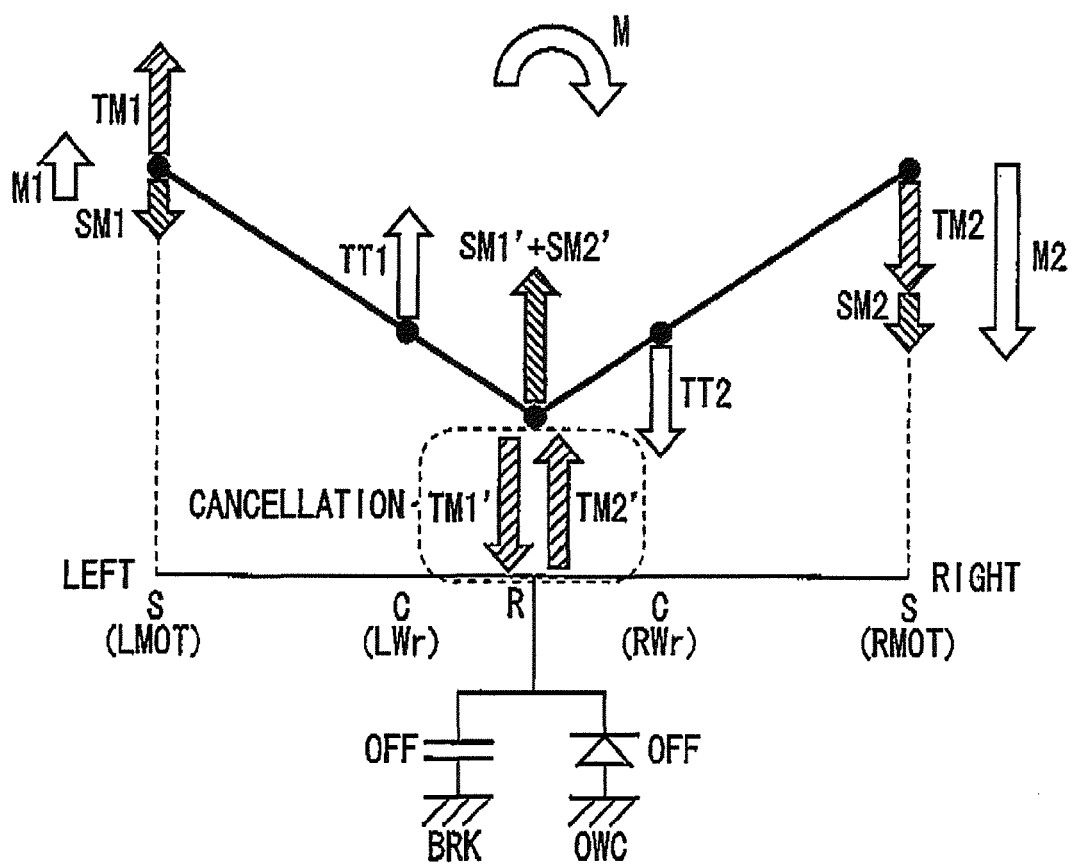
FIG. 13 is a speed alignment chart for the rear wheel drive unit at the time when the target torque control and the target rotation speed control are performed simultaneously in the ring-free control.

FIG. 13 illustrates the first and second motor base torques TM1 and TM2 and their distribution forces, that is, the first and second motor base torque distribution forces TM1' and TM2' illustrated in FIG. 12A, and also illustrates the first and second rotation control torques SM1 and SM2 and their distribution forces, that is, the first and second rotation control torque distribution forces SM1' and SM2' illustrated in FIG. 12B.

In this case, in reality, a first motor torque M1 (the first motor base torque TM1+the first rotation control torque SM1) in the forward direction is generated from the first electric motor 2A, and a second motor torque M2 (the second motor base torque TM2+the second rotation control torque SM2) in the reverse direction is generated from the second electric motor 2B. Hence, the left rear wheel torque TT1 in the forward direction is exerted to the planetary carrier 23A and the right rear wheel torque TT2 in the reverse direction is exerted to the planetary carrier 23B, whereby a clockwise yaw moment M is generated. Furthermore, at the same time, the rotation speeds of the first and second electric motors 2A and 2B and the rotation speeds of the sun gears 21A and 21B are decreased, and the rotation speed of the ring gears 24A and 24B is increased, and then the rotation speeds of the first and second electric motors 2A and 2B eventually reach the motor target rotation speeds.

Next, the switching between the ring-locking control and the ring-free control, a feature of the present invention, will be described below. In the present invention, in the case that the switching between the ring-locking control and the ring-free control is performed, the switching is performed based on the following four reference values (a first reference value to a fourth reference value).

<First Reference Value>

In the above-mentioned example, a case has been described in which when the vehicle speed is changed from the forward middle speed to the forward high speed, the ring-locking control is changed to the ring-free control by switching the state of the hydraulic brakes 60A and 60B from the weakly engaged state to the released state. In other words, a case has been exemplified in which the ring-locking control is changed to the ring-free control by using the vehicle speed of the vehicle 3 as a reference value and by comparing this reference value with a predetermined threshold value. However, instead of using the vehicle speed as the reference value, it may be possible to use a rotation state amount related value of the first electric motor 2A (for example, the detection value of the resolver 20A or the rotation speed of the sun gear 21A); it may also be possible to use a rotation state amount related value of the second electric motor 2B (for example, the detection value of the resolver 20B or the rotation speed of the sun gear 21B); it may further be possible to use a rotation state amount related value of the left rear wheel LWr (for example, the detection value of the wheel speed sensor or the rotation speed of the planetary carrier 23A); it may also be possible to use a rotation state amount related value of the right rear wheel RWr (for example, the detection value of the wheel speed sensor or the rotation speed of the planetary carrier 23B); these being related to the vehicle speed. It is herein assumed that the vehicle speed, the rotation state amount related value of the first electric motor 2A, the rotation state amount related value of the second electric motor 2B, the rotation state amount related value of the left rear wheel LWr and the rotation state amount related value of the right rear wheel RWr are each referred to as a first reference value. The first and second electric motors 2A and 2B are prevented from rotating at over speed by the switching from the ring-locking control to the ring-free control based on the first reference value.

The switching from the ring-locking control to the ring-free control will be described below referring to FIGS. 14A to 14C.

Figure 14A:
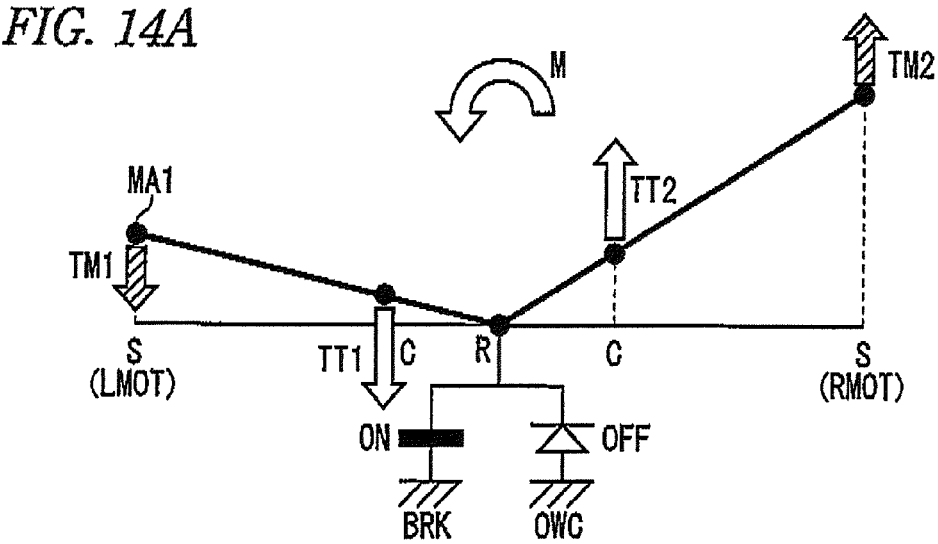

FIG. 14A shows a state in which at the time when the vehicle 3 is turning left in the middle speed range of the vehicle 3 (at the time of forward middle-speed travel), that is, depending on the difference between the rotation speeds of the left rear wheel LWr and the right rear wheel RWr, the rotation speeds of the sun gear 21B and the planetary carrier 23B of the second planetary gear reducer 12B become larger than the rotation speeds of the sun gear 21A and the planetary carrier 23A of the first planetary gear reducer 12A. To assist the turning of the vehicle 3, the rear wheel drive unit 1 causes the first motor base torque TM1 in the reverse direction to be generated from the first electric motor 2A and causes the second motor base torque TM2 being equal to the first motor base torque TM1 in absolute value but opposite in direction (the forward direction) to be generated from the second electric motor 2B, whereby a counterclockwise yaw moment M is generated.

In this state, when the vehicle speed serving as the first reference value exceeds the threshold value and reaches the high speed range, a command for releasing the hydraulic brakes 60A and 60B is input. In the case that the hydraulic brakes 60A and 60B are released, the sun gears 21A and 21B (S) and the ring gears 24A and 24B (R), other than the planetary carriers 23A and 23B (C) connected to the left rear wheel LWr and the right rear wheel RWr, can have any given rotation speeds. For example, as shown in FIG. 14B, in order that the first electric motor 2A rotating at a rotation speed MA1 is rotated at a rotation speed MA2, at which the efficiency of the first electric motor 2A is high, the rotation speed MA2 is set to the motor target rotation speed of the first electric motor 2A, and the hydraulic brakes 60A and 60B are released. Furthermore, the first rotation control torque SM1 in the reverse direction depending on the difference in rotation speed between the actual motor rotation speed MA1 and the motor target rotation speed MA2 is further generated in the first electric motor 2A, and the second rotation control torque SM2 being equal in absolute value to the first rotation control torque SM1 and having the same direction (the reverse direction) is also generated in the second electric motor 2B.

At this time, in reality, the first motor torque M1 (the first motor base torque TM1+the first rotation control torque SM1) is generated from the first electric motor 2A, and the second motor torque M2 (the second motor base torque TM2+the second rotation control torque SM2) is generated from the second electric motor 2B. Then, when the actual motor rotation speed MA1 of the first electric motor 2A has reached the motor target rotation speed MA2, the first and second rotation control torques SM1 and SM2 are extinguished as shown in FIG. 14C. The rotation speed of the second electric motor 2B and the rotation speed of the sun gear 21B at this time are uniquely determined by the rotation speed of the planetary carriers 23B connected to the right rear wheel RWr and the rotation speed of the ring gears 24A and 24B.

As described above, the rotation control torques being equal in absolute value and having the same direction are exerted to both the electric motors, whereby the first and second electric motors 2A and 2B are prevented from rotating at over speed while the predetermined yaw moment is generated even in the ring-free state.

Figure 15A:
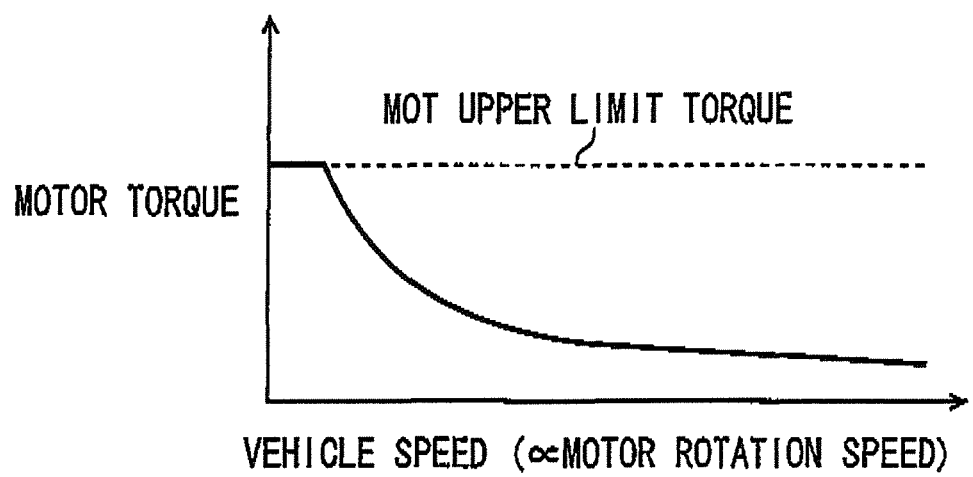
FIG. 15A is a view showing the relationship between the vehicle speed and the motor torque in the ring-locking state.

However, since the ring gears 24A and 24B are locked in the ring-locking state, when the rotation speeds of the planetary carriers 23A and 23B connected to the left and right rear wheels LWr and RWr are increased depending on the vehicle speed, the rotation speeds of the sun gears 21A and 21B and the rotation speeds of the first and second electric motors 2A and 2B connected to the sun gears 21A and 21B are also increased accordingly. The electric motor has a property in which the motor torque that can be output decreases as the motor rotation speed increases. Hence, since the motor rotation speed is proportional to the vehicle speed in the ring-locking state, the motor torques that can be output from the first and second electric motors 2A and 2B decrease as the vehicle speed increases as shown in FIG. 15A.

Figure 15B:
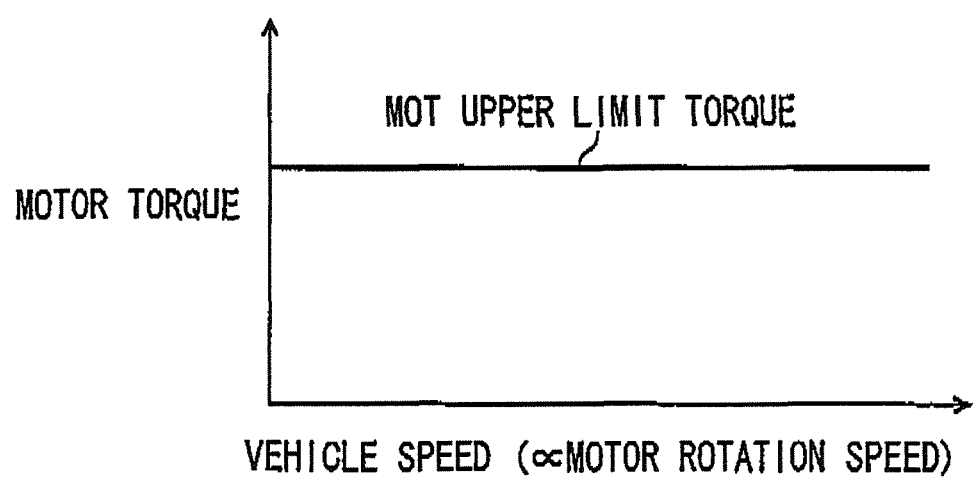
FIG. 15B is a view showing the relationship between the vehicle speed and the motor torque in the ring-free state.

On the other hand, since the ring gears 24A and 24B are allowed to rotate freely in the ring-free state, even if the rotation speeds of the planetary carriers 23A and 23B connected to the left and right rear wheels LWr and RWr increase depending on the vehicle speed, the rotation speeds of the sun gears 21A and 21B and the rotation speeds of the first and second electric motors 2A and 2B connected to the sun gears 21A and 21B can be set freely, regardless of the rotation speeds of the planetary carriers 23A and 23B. Hence, in the ring-free state, the rotation speeds of the motors are not proportional to the vehicle speed. As shown in FIG. 15B, regardless of the increase in the vehicle speed, the motor torques that can be output from the first and second electric motors 2A and 2B can be set freely up to the upper limit torque (MOT upper limit torque) of the electric motors determined by the electric motor specifications.

Figure 16:
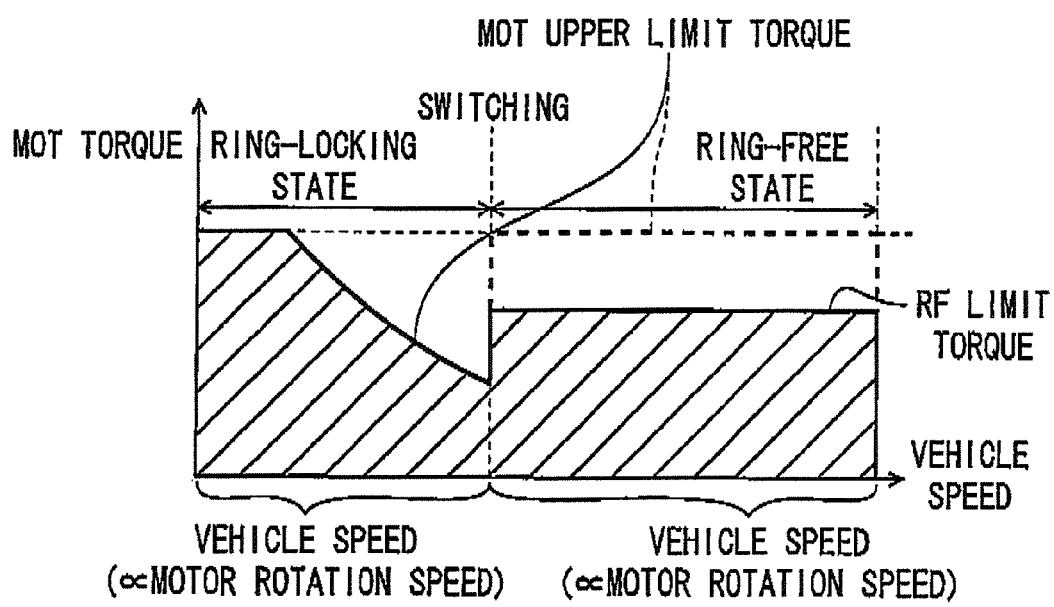
FIG. 16 is a view showing the relationship between the vehicle speed and the motor torque in the case that the ring-locking state is switched to the ring-free state at a given vehicle speed, the ring-free limit torque (RF limit torque) of the first and second electric motors after the switching being set to a value larger in absolute value than the upper limit torque (MOT upper limit torque) of the electric motors in the ring-locking state at the time of the switching.

As shown in FIG. 16, when the state is switched from the ring-locking state to the ring-free state, the controller 8 performs control so that a ring-free limit torque (RF limit torque) serving as the limit torque of the first and second electric motors 2A and 2B after the switching is set to a value larger in absolute value than the upper limit torque (MOT upper limit torque) of the first and second electric motors 2A and 2B determined by the electric motor specifications in the ring-locking state at the time of the switching and so that the torques generated by the first and second electric motors 2A and 2B are less than the ring-free limit torque (RF limit torque).

The upper limit torque (MOT upper limit torque) of the electric motors determined by the electric motor specifications in FIG. 16 and the following figures may be a short-time rating drive torque that is applied, for example, at the start time of the vehicle 3 or may be a continuous rating drive torque that is set to a value smaller in absolute value than the short-time rating drive torque in consideration of the overheat of the motors. In addition, the ring-free limit torque (RP limit torque) in FIG. 16 and the following figures can be set freely up to the upper limit torque (MOT upper limit torque) of the electric motors determined by the electric motor specifications.

Figure 14B:
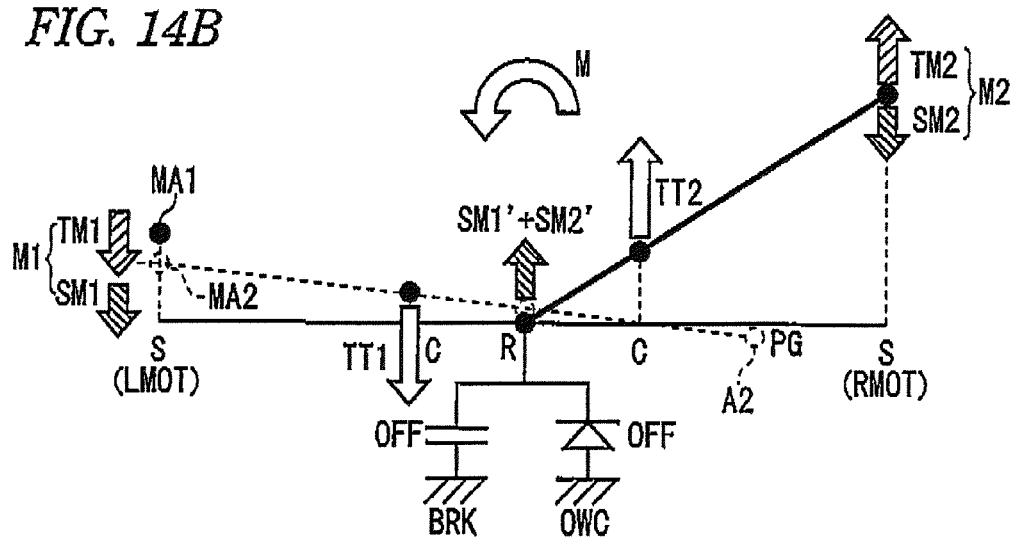
Figure 14C:
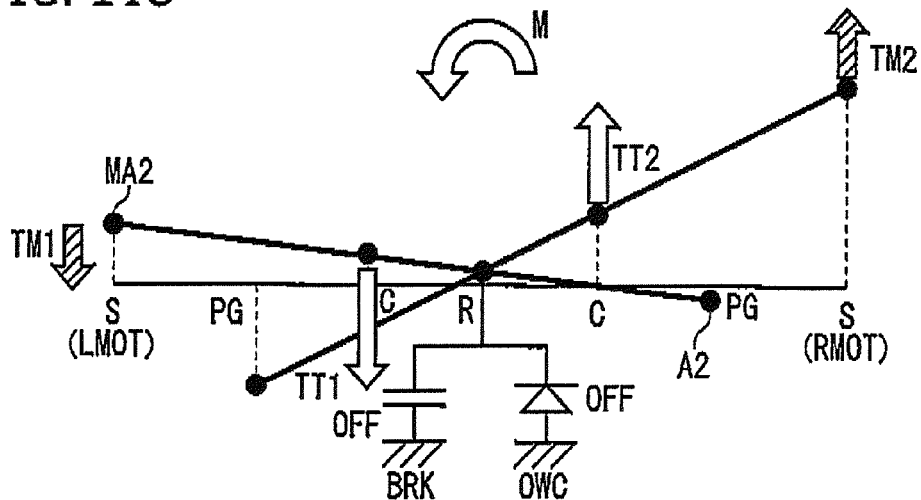

When this control is applied to the examples shown in FIGS. 14A to 14C, the controller 8 performs control so that the ring-free limit torque (RF limit torque) of the first and second electric motors 2A and 2B in FIG. 14C is set to a value larger in absolute value than the upper limit torque determined by the electric motor specifications of the first and second electric motors 2A and 2B in FIG. 14A and so that the first and second motor base torques TM1 and TM2 in FIG. 14C are less than the ring-free limit torque (RF limit torque) having been set.

Figure 17:
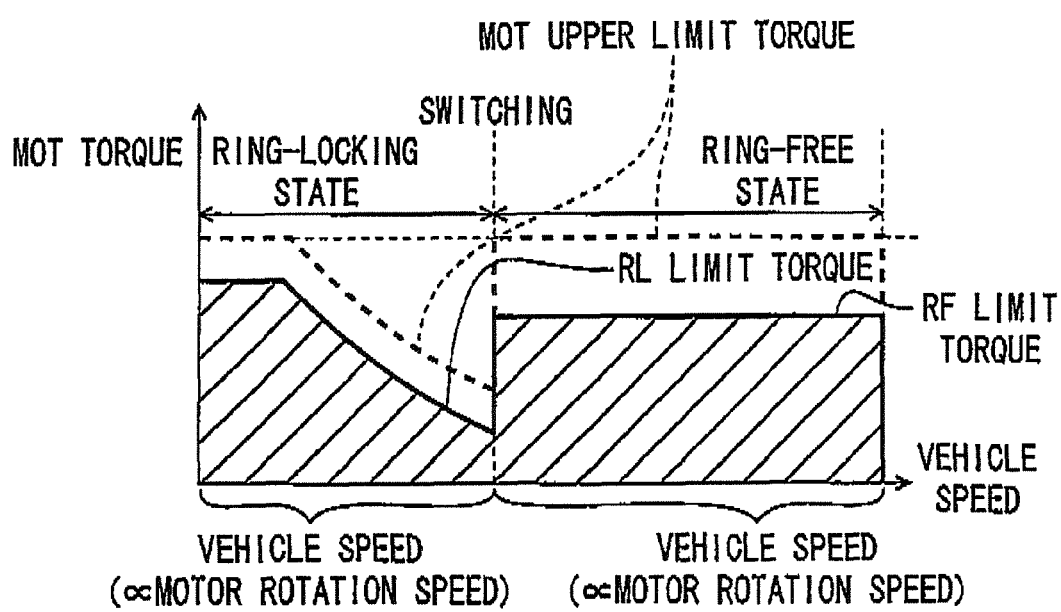
FIG. 17 is a view showing the relationship between the vehicle speed and the motor torque in the case that the ring-locking state is switched to the ring-free state at a given vehicle speed, the ring-free limit torque (RF limit torque) of the first and second electric motors after the switching being set to a value larger in absolute value than the ring-locking limit torque (RL limit torque) of the electric motors in the ring-locking state at the time of the switching.

In addition, as shown in FIG. 17, in the ring-locking state, the controller 8 may set a ring-locking limit torque (RL limit torque) serving as the limit torque of the first and second electric motors 2A and 2B to a value smaller in absolute value than the upper limit torque (MOT upper limit torque) of the first and second electric motors 2A and 2B. In this case, the controller 8 performs control so that the ring-free limit torque (RF limit torque) serving as the limit torque of the first and second electric motors 2A and 2B after the switching is set to a value larger in absolute value than the ring-locking limit torque (RL limit torque) at the time of the switching and so that the torques generated by the first and second electric motors 2A and 2B are less than the ring-free limit torque (RF limit torque).

As described above, in the ring-free state, the correlation between the rotation speeds of the first and second electric motors 2A and 2B and the rotation speeds of the left and right rear wheels LWr and RWr is lost, and on the other hand, the motor torques being equal in absolute value but opposite in direction can be transmitted to the left and right rear wheels LWr and RWr. By making the most of this fact, the limit torque after the release of the hydraulic brakes 60A and 60B is made higher than the limit torque in the ring-locking state, whereby the driving stability of the vehicle can be improved.

Figure 18:
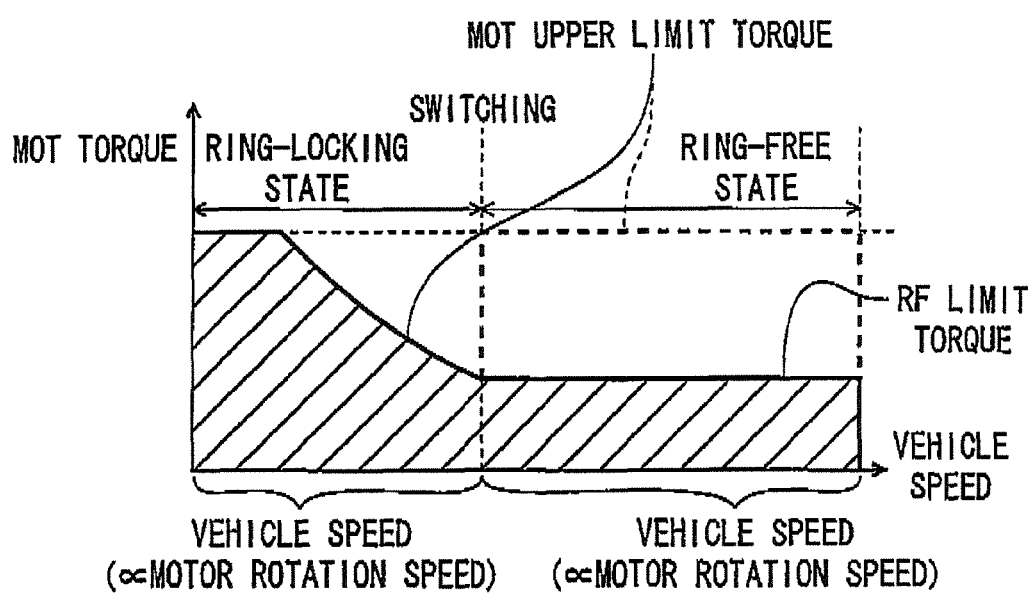
FIG. 18 is a view showing the relationship between the vehicle speed and the motor torque in the case that the ring-locking state is switched to the ring-free state at a given vehicle speed, the ring-free limit torque (RF limit torque) of the first and second electric motors after the switching being set to a value nearly equal to the upper limit torque (MOT upper limit torque) of the electric motors in the ring-locking state at the time of the switching.
Figure 19:
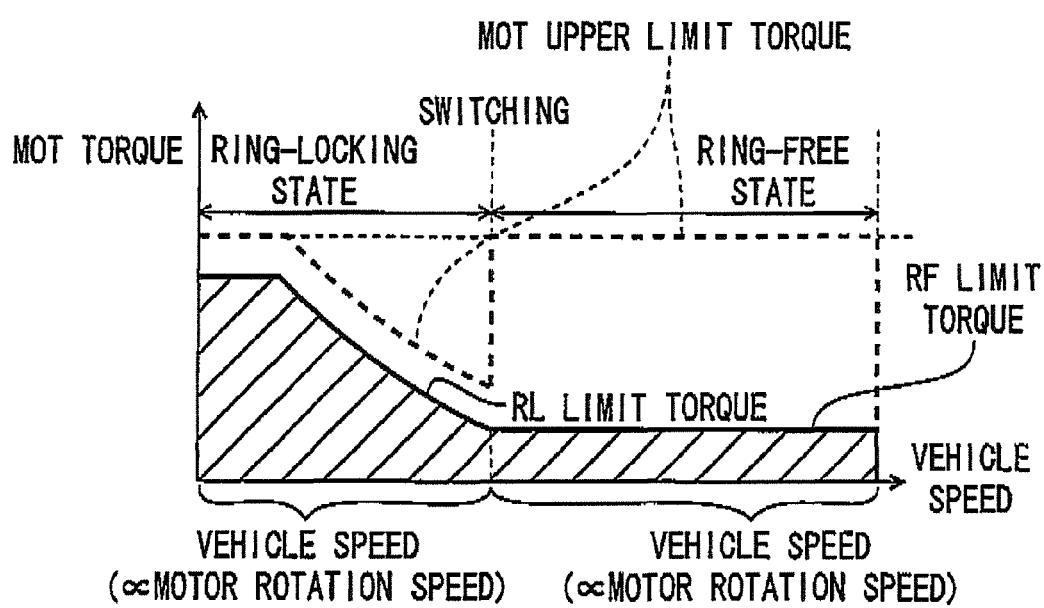
FIG. 19 is a view showing the relationship between the vehicle speed and the motor torque in the case that the ring-locking state is switched to the ring-free state at a given vehicle speed, the ring-free limit torque (RF limit torque) after the switching being set to a value nearly equal to the ring-locking limit torque (RL limit torque) of the first and second electric motors in the ring-locking state at the time of the switching.

In the examples in FIGS. 16 and 17 described above, control is performed so that the ring-free limit torque (RF limit torque) serving as the limit torque of the first and second electric motors 2A and 2B after the switching is set to a value larger in absolute value than the upper limit torque (MOT upper limit torque) or the ring-locking limit torque (RL limit torque) of the first and second electric motors 2A and 2B in the ring-locking state at the time of the switching. However, control may be performed so that as shown in FIGS. 18 and 19, the ring-free limit torque (RF limit torque) serving as the limit torque of the first and second electric motors 2A and 2B after the switching is set to a value nearly equal to the upper limit torque (MOT upper limit torque) or the ring-locking limit torque (RL limit torque) of the first and second electric motors 2A and 2B in the ring-locking state at the time of the switching and so that the torques generated by the first and second electric motors 2A and 2B are less than the ring-free limit torque (RF limit torque).

As described above, in the ring-free state, the correlation between the rotation speeds of the first and second electric motors 2A and 2B and the rotation speeds of the left and right rear wheels LWr and RWr is lost, and on the other hand, the motor torques being equal in absolute value but opposite in direction can be transmitted to the left and right rear wheels LWr and RWr. In the case that the limit torque after the release of the hydraulic brakes 60A and 60B is set so as to be nearly equal to the limit torque in the ring-locking state, the sudden change in torque at the time of the switching from the ring-locking state to the ring-free state can be suppressed.

Figure 20:
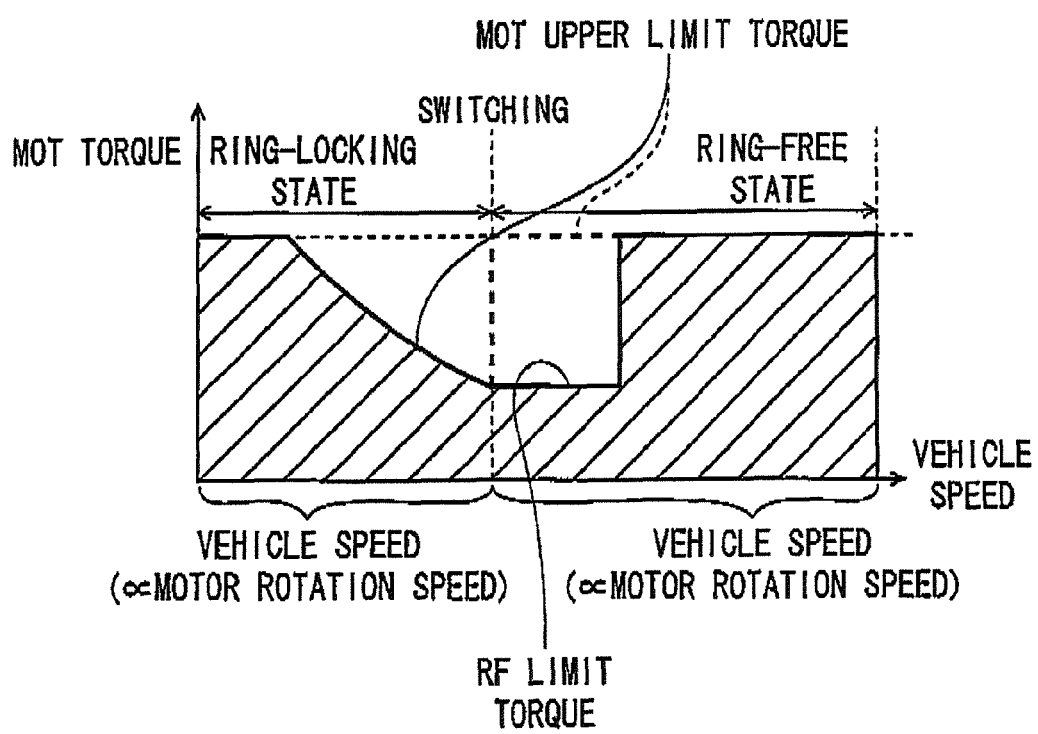
FIG. 20 is a view showing the relationship between the vehicle speed and the motor torque in the case that the ring-locking state is switched to the ring-free state at a given vehicle speed, the ring-free limit torque (RF limit torque) of the first and second electric motors after the switching being changed from a value nearly equal to the upper limit torque (MOT upper limit torque) of the electric motors in the ring-locking state at the time of the switching.

Furthermore, when the vehicle speed has increased further or a predetermined time has passed after the switching, the ring-free limit torque (RE limit torque) of the first and second electric motors 2A and 2B may be changed within the range of the upper limit torque (MOT upper limit torque) of the electric motors determined by the electric motor specifications as shown in FIG. 20. With this change, even in the case that the target yaw moment is changed, the driving stability of the vehicle can be maintained. Although the case in which the power drive of the first and second electric motors 2A and 2B is performed has been described in FIGS. 16 to 20, the description thereof is similar to that of the case in which regenerative drive is performed.

In the ring-locking state, the motor torque that can be output decreases gradually as the vehicle speed increases as described above. However, by virtue of the switching from the ring-locking state to the ring-free stat, the motor torque that can be output increases, regardless of the vehicle speed. This property is used in second to fourth reference values described below. By the switching of the state of the hydraulic brakes 60A and 60B between the engaged state and the released state based on the first reference value, the state is switched between the ring-locking state to the ring-free state, and furthermore, the switching is also performed based on at least one of the second to fourth reference values serving as other reference values.

Also in the case that the switching is performed based on the second to fourth reference values described later, control is performed so that the ring-free limit torque (RF limit torque) serving as the limit torque of the first and second electric motors 2A and 2B after the switching is set to a value larger in absolute value than the upper limit torque (MOT upper limit torque) or the ring-locking limit torque (RL limit torque) of the first and second electric motors 2A and 2B in the ring-locking state at the time of the switching or set to a value nearly equal to the upper limit torque (MOT upper limit torque) or the ring-locking limit torque (RL limit torque) of the first and second electric motors 2A and 2B in the ring-locking state at the time of the switching so that the torques generated by the first and second electric motors 2A and 2B are less than the ring-free limit torque (RF limit torque) as in the case that the switching is performed based on the first reference value.

<Second Reference Value>

The second reference value is either one of the torque state amount related value of the first electric motor 2A (for example, the motor torque of the first electric motor 2A, the motor drive power of the first electric motor 2A or the motor current of the first electric motor 2A), the torque state amount related value of the second electric motor 2B (for example, the motor torque of the second electric motor 2B, the motor drive power of the second electric motor 2B or the motor current of the second electric motor 2B), the torque state amount related value of the left rear wheel LWr (for example, the wheel torque of the left rear wheel LWr or the wheel drive power of the left rear wheel LWr) or the torque state amount related value of the right rear wheel RWr (for example, the wheel torque of the right rear wheel RWr or the wheel drive power of the right rear wheel RWr).

For example, in the case that the motor torque that can be output at a given vehicle speed is lower than a requested torque, the state is switched from the ring-locking state to the ring-free state, whereby the motor torque that can be output increases and can satisfy the requested output. Since the torques of the first and second electric motors 2A and 2B in the same direction are not transmitted to the rear wheels Wr in the ring-free state as described above, the requested torque is a torque satisfying a yaw moment request.

Even before the vehicle speed reaches the predetermined threshold value serving as the first reference value at the time of forward middle-speed travel, the hydraulic brakes 60A and 60B are released and the first and second motor base torques TM1 and TM2 are increased based on the second reference value so that the requested torque for the yaw moment request is satisfied as described above, whereby the shortage of the torques of the first and second electric motors 2A and 2B can be eliminated.

Furthermore, when a predetermined threshold value is provided for the second reference value and when the second reference value is equal to or more than the threshold value, control may be performed to release the hydraulic brakes 60A and 60B. In the high-speed range of the vehicle, the torque generated by the electric motor in the ring-locking state is larger than that in the ring-free state. Hence, in the case that the hydraulic brakes 60A and 60B are released when the torque or the drive power is large, the turning performance and stability of the vehicle are improved. However, even in this case, priority is given to the switching based on the first reference value over the switching based on the second reference value, whereby damage due to over speed of the electric motors can be prevented securely On the other hand, in the case that the total target torque TRT of the left and right rear wheels LWr and RWr in the ring-locking state is equal to or less than a predetermined threshold value, the state may be switched to the ring-free state. In the case that the total target torque TRT of the left and right rear wheels LWr and RWr is equal to or less than a predetermined threshold value, the necessity for satisfying the total target torque TRT of the left and right rear wheels LWr and RWr is lowered. Hence, it is possible that the control is switched to the ring-free control and that priority is given to the improvement in the turning performance. The two threshold values can be set respectively as desired.

<Third Reference Value>

A third reference value is a turning state amount related value of the vehicle 3 (for example, yaw moment, under-steering or over-steering).

For example, in the case that the yaw moment is more that a predetermined threshold value or in the case that under-steering is detected, the limit of the motor torque is eliminated, and a large torque difference is generated between the torques of the first and second electric motors 2A and 2B, whereby a large yaw moment can be generated. As a result, the under-steering can be eliminated.

In this way, even before the vehicle speed serving as the first reference value reaches the predetermined threshold value at the time of forward middle-speed travel (in the ring-locking state), in the case that the yaw moment serving as the third reference value is more than the predetermined threshold value or in the case that under-steering is detected, the hydraulic brakes 60A and 60B are released based on the third reference value, and the torque difference between the torques of the first and second electric motors 2A and 2B is increased, whereby the under-steering state can be eliminated and the turning performance of the vehicle can be improved.

<Fourth Reference Value>

The fourth reference value is either the lateral acceleration related value of the vehicle 3 (for example, lateral acceleration or lateral force) or a road surface friction state related value (for example, road surface resistance or slip state amount).

For example, in the case that the lateral acceleration is more than a predetermined threshold value or in the case that the road surface resistance is large, the gripping forces of the left and right rear wheels LWr and RWr are high. Hence, the limit in the motor torque is eliminated and a large torque difference is generated between the torques of the first and second electric motors 2A and 2B, whereby the stability of the vehicle can be improved.

In this way, even before the vehicle speed serving as the first reference value reaches the predetermined threshold value at the time of forward middle-speed travel (in the ring-locking state), in the case that the lateral acceleration serving as the fourth reference value is more than the predetermined threshold value or in the case that the road surface resistance is large, the hydraulic brakes 60A and 60B are released based on the fourth related value, and the torque difference between the torques of the first and second electric motors 2A and 2B is increased, whereby the stability of the vehicle can be improved.

As described above, control is performed so that the ring-free limit torque (RF limit torque) serving as the limit torque of the first and second electric motors 2A and 23 after the switching is set to a value larger in absolute value than the upper limit torque (MOT upper limit torque) or the ring-locking limit torque (RL limit torque) of the first and second electric motors 2A and 2B in the ring-locking state at the time of the switching, or set to a value nearly equal to the upper limit torque (MOT upper limit torque) or the ring-lacking limit torque (RI, limit torque) of the first and second electric motors 2A and 23 in the ring-locking state at the time of the switching and so that the torques generated by the first and second electric motors 2A and 2B are less than the ring-free limit torque (RE limit torque), whereby the driving stability of the vehicle can be improved and the sudden change in torque at the time of the switching from the ring-locking state to the ring-free state can be suppressed.

The present invention is not limited to the above-mentioned embodiment but can be modified, improved, etc. appropriately.

For example, the hydraulic brakes 60A and 60B are not required to be provided for the ring gears 24A and 243, respectively. At least one hydraulic brake should only be provided for the connected ring gears 24A and 243. Furthermore, the one-way clutch is not necessarily required to be provided. In this case, the state can be changed from the ring-locking state to the ring-free state by controlling the hydraulic brake so that its state is changed from its released state to its engaged state.

In addition, although the hydraulic brake is taken as an example of the rotation restrictor, without being limited to this type, a mechanical type, an electromagnetic type, etc. can be selected as desired.

Furthermore, although the first and second electric motors 2A and 2B are connected to the sun gears 21A and 21B and the ring gears are connected to each other, without being limited to this configuration, the sun gears may be connected to each other, and the first and second electric motors 2A and 2B may be connected to the ring gears.

Moreover, the front wheel drive unit may be driven by using an electric motor as only one drive source, without using the internal combustion engine.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A vehicle drive device comprising:
   a left wheel drive unit comprising:
      a first electric motor that drives a left wheel of a vehicle; and
      a first speed changer disposed on a power transmission path between the first electric motor and the left wheel;
   a right wheel drive unit comprising:
      a second electric motor that drives a right wheel of the vehicle; and
      a second speed changer disposed on a power transmission path between the second electric motor and the right wheel;
   an electric motor controller that controls the first electric motor and the second electric motor,
   wherein
      each of the first and second speed changers comprises first, second, and third rotation elements, the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises:
- a rotation restrictor capable of being released and locked and configured to restrict the rotations of the third rotation elements when being locked; and
- a state switching unit configured to switch between a free state of the third rotation elements and a restricted state of the third rotation elements, wherein the state switching unit releases the rotation restrictor in the free state, and the state switching unit locks the rotation restrictor in the restricted state, wherein when the state switching unit switches from the restricted state to the free state, the electric motor controller performs control such that a free-state limit torque, which is a limit torque of the first electric motor or the second electric motor after switching to the free state is set to a value larger in absolute value than an upper limit torque of the first electric motor or the second electric motor determined by electric motor specifications at the time of switching or is set to a value larger in absolute value than a restricted state limit torque at the time of switching, wherein the restricted state limit torque is a limit torque of the first electric motor or the second electric motor, which is set to a value smaller in absolute value than the upper limit torque, and the electric motor controller performs control such that the torque generated by the first electric motor or the second electric motor is less than the free-state limit torque.

2. The vehicle drive device of claim 1, wherein the state switching unit is configured to switch between the free state and the restricted state based on a first reference value, wherein the first reference value is selected from any one of the following values:
  i) a rotation state amount related value of the first electric motor;
  ii) a rotation state amount related value of the second electric motor;
  iii) a rotation state amount related value of the left wheel;
  iv) a rotation state amount related value of the right wheel; and
  v) a speed of the vehicle, and wherein the state switching unit is configured to switch between the free state and the restricted state based on second, third, and fourth reference values as well as the first reference value, wherein the second reference value is selected from any one of following values:
  i) a torque state amount related value of the first electric motor;
  ii) a torque state amount related value of the second electric motor;
  iii) a torque state amount related value of the left wheel; and
  iv) a torque state amount related value of the right wheel, wherein the third reference value is a turning state amount related value of the vehicle, wherein the fourth reference value is selected any one of a lateral acceleration related value of the vehicle and a road surface friction state related value.

3. The vehicle drive device of claim 2, wherein when the second reference value is equal to or more than a predetermined value, the state switching unit releases the rotation restrictor so as to switch from the restricted state to the free state.

4. The vehicle drive device of claim 3, wherein the state switching unit gives priority to the switching based on the first reference value over the switching based on the second reference value.

5. The vehicle drive device of claim 1, wherein the state switching unit locks the rotation restrictor based on a first reference value so as to switch to the restricted state, wherein the first reference value is selected from any one of the following values:
  i) a rotation state amount related value of the first electric motor;
  ii) a rotation state amount related value of the second electric motor;
  iii) a rotation state amount related value of the left wheel;
  iv) a rotation state amount related value of the right wheel; and
  v) the speed of the vehicle, and wherein the state switching unit releases the rotation restrictor based on a reference value other than the first reference value so as to switch from the restricted state to the free state.

6. The vehicle drive device of claim 5, wherein the reference value other than the first reference value is at least one of a second reference value, a third reference value and a fourth reference value, wherein the third reference value is selected from any one of the following values:
  i) a torque state amount related value of the first electric motor;
  ii) a torque state amount related value of the second electric motor;
  iii) a torque state amount related value of the left wheel; and
  iv) a torque state amount related value of the right wheel, wherein the third reference value is a turning state amount related value of the vehicle, and wherein the fourth reference value is selected from any one of a lateral acceleration related value of the vehicle and a road surface friction state related value.

7. A vehicle drive device comprising:
a left wheel drive unit comprising:
  a first electric motor that drives a left wheel of a vehicle; and
  a first speed changer disposed on a power transmission path between the first electric motor and the left wheel;
a right wheel drive unit comprising:
  a second electric motor that drives a right wheel of the vehicle; and
  a second speed changer disposed on a power transmission path between the second electric motor and the right wheel;
an electric motor controller that controls the first electric motor and the second electric motor,
wherein
each of the first and second speed changers comprises first, second, and third rotation elements,
the first electric motor is connected to the first rotation element of the first speed changer, the second electric motor is connected to the first rotation element of the second speed changer, the left wheel is connected to the second rotation element of the first speed changer, the right wheel is connected to the second rotation element of the second speed changer, the third rotation element of the first speed changer and the third rotation element of the second speed changer are connected to each other, wherein the vehicle drive device further comprises:

a rotation restrictor capable of being released and locked and configured to restrict the rotations of the third rotation elements when being locked; and a state switching unit configured to switch between a free state of the third rotation elements and a restricted state of the third rotation elements, wherein the state switching unit releases the rotation restrictor in the free state, and the state switching unit locks the rotation restrictor in the restricted state, wherein when the state switching unit switches from the restricted state to the free state, the electric motor controller performs control such that a free-state limit torque, which is a limit torque of the first electric motor or the second electric motor after switching to the free state is set to a value substantially equal to an upper limit torque of the first electric motor or the second electric motor determined by electric motor specifications at the time of switching or is set to a value substantially equal to a restricted state limit torque at the time of switching, wherein the restricted state limit torque is a limit torque of the first electric motor or the second electric motor, which is set to a value smaller in absolute value than the upper limit torque, and the electric motor controller performs control such that the torque generated by the first electric motor or the second electric motor is less than the free-state limit torque.

8. The vehicle drive device of claim 7, wherein the state switching unit is configured to switch between the free state and the restricted state based on a first reference value, wherein the first reference value is selected from any one of the following values:

i) a rotation state amount related value of the first electric motor;

ii) a rotation state amount related value of the second electric motor;

iii) a rotation state amount related value of the left wheel;

iv) a rotation state amount related value of the right wheel; and v) a speed of the vehicle, and wherein the state switching unit is configured to switch between the free state and the restricted state based on second, third, and fourth reference values as well as the first reference value, wherein the second reference value is selected from any one of following values:

i) a torque state amount related value of the first electric motor;

ii) a torque state amount related value of the second electric motor;

iii) a torque state amount related value of the left wheel; and iv) a torque state amount related value of the right wheel, wherein the third reference value is a turning state amount related value of the vehicle, wherein the fourth reference value is selected any one of a lateral acceleration related value of the vehicle and a road surface friction state related value.

9. The vehicle drive device of claim 8, wherein when the second reference value is equal to or more than a predetermined value, the state switching unit releases the rotation restrictor so as to switch from the restricted state to the free state.

10. The vehicle drive device of claim 9, wherein the state switching unit gives priority to the switching based on the first reference value over the switching based on the second reference value.

11. The vehicle drive device of claim 2, wherein the state switching unit locks the rotation restrictor based on a first reference value so as to switch to the restricted state, wherein the first reference value is selected from any one of following values:

i) a rotation state amount related value of the first electric motor;

ii) a rotation state amount related value of the second electric motor;

iii) a rotation state amount related value of the left wheel;

iv) a rotation state amount related value of the right wheel; and v) the speed of the vehicle, and wherein the state switching unit releases the rotation restrictor based on a reference value other than the first reference value so as to switch from the restricted state to the free state.

12. The vehicle drive device of claim 11, wherein the reference value other than the first reference value is at least one of a second reference value, a third reference value and a fourth reference value, wherein the third reference value is selected from any one of the following values:

i) a torque state amount related value of the first electric motor;

ii) a torque state amount related value of the second electric motor;

iii) a torque state amount related value of the left wheel; and iv) a torque state amount related value of the right wheel, wherein the third reference value is a turning state amount related value of the vehicle, and wherein the fourth reference value is selected from any one of a lateral acceleration related value of the vehicle and a road surface friction state related value.

* * * * *